United States Patent
Tanaka

(10) Patent No.: US 10,757,317 B2
(45) Date of Patent: Aug. 25, 2020

(54) ZOOM LENS, EXTENDER LENS, AND IMAGING APPARATUS

(71) Applicant: FUJIFILM Corporation, Tokyo (JP)

(72) Inventor: Takuya Tanaka, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 16/451,293

(22) Filed: Jun. 25, 2019

(65) Prior Publication Data
US 2020/0007745 A1    Jan. 2, 2020

(30) Foreign Application Priority Data

Jun. 29, 2018   (JP) .................................. 2018-125341

(51) Int. Cl.
| | | |
|---|---|---|
| H04N 5/232 | (2006.01) | |
| G02B 7/02 | (2006.01) | |
| G02B 7/04 | (2006.01) | |
| H04N 5/225 | (2006.01) | |

(52) U.S. Cl.
CPC ......... *H04N 5/23212* (2013.01); *G02B 7/021* (2013.01); *G02B 7/04* (2013.01); *H04N 5/2254* (2013.01); *H04N 5/23296* (2013.01)

(58) Field of Classification Search
CPC ............. H04N 5/23212; H04N 5/2254; H04N 5/23296; G02B 7/021; G02B 7/04
See application file for complete search history.

(56) References Cited

U.S. PATENT DOCUMENTS

| | | | |
|---|---|---|---|
| 6,104,546 A | 8/2000 | Yoshikawa | |
| 2018/0188511 A1* | 7/2018 | Yonezawa | ............ G02B 15/163 |
| 2018/0217360 A1* | 8/2018 | Ikeda | ........................ G02B 9/60 |

FOREIGN PATENT DOCUMENTS

| | | |
|---|---|---|
| JP | 3513264 B2 | 3/2004 |
| JP | 3862117 B2 | 12/2006 |
| JP | 2011-075646 A | 4/2011 |

\* cited by examiner

*Primary Examiner* — Nicholas G Giles
(74) *Attorney, Agent, or Firm* — Studebaker & Brackett PC

(57) ABSTRACT

A zoom lens has, in order from an object side, a focusing unit including a focusing lens group moving for focusing, a variable magnification unit including at least two variable magnification lens groups moving while changing a mutual interval for variable magnification, an aperture stop, and an image forming unit including an image forming lens group. The image forming unit consists of, in order from the object side, an M1 lens group, an M2N lens group, and an M3 lens group. The M2N lens group is replaceable with an M2E lens group that enlarges an image forming magnification. The M2E lens group satisfies predetermined conditional expressions (1) to (4).

20 Claims, 9 Drawing Sheets

EXAMPLE 1 (REFERENCE STATE)

EXAMPLE 1 (REPLACEMENT STATE)

EXAMPLE 3 (REPLACEMENT STATE)

EXAMPLE 1 (REFERENCE STATE)

EXAMPLE 1 (REPLACEMENT STATE)

EXAMPLE 3 (REPLACEMENT STATE)

ZOOM LENS, EXTENDER LENS, AND IMAGING APPARATUS

CROSS REFERENCE TO RELATED APPLICATIONS

The present application claims priority under 35 U.S.C. § 119 to Japanese Patent Application No. 2018-125341 filed on Jun. 29, 2018. The above application is hereby expressly incorporated by reference, in its entirety, into the present application.

BACKGROUND OF THE INVENTION

1. Field of the Invention

The present disclosure relates to a zoom lens, an extender lens, and an imaging apparatus.

2. Description of the Related Art

In recent years, improvement of image quality of video is progressing, and there is a need for a lens system having resolution performance of 4K or more that is usable in an imaging apparatus, such as a broadcasting camera. As the lens system for the broadcasting camera, since it is desirable that the lens system has a variable magnification function capable of responding to various scenes, a zoom lens is generally used. When variable magnification is further requested, an extender lens that has a variable focal length of an entire system is used. JP2011-075646A, JP3862117B, and JP3513264B describe that a part of lens groups in a zoom lens is insertable into and removable from an optical path and the lens group is replaced with an extender lens.

SUMMARY OF THE INVENTION

In a case where a part of lens groups in a zoom lens with an invariable total length is replaced with an extender lens, a temperature characteristic changes with enlargement of an afocal magnification. In a case where the temperature characteristic of the zoom lens changes, there is a problem in that focal position misalignment with change in temperature occurs. In the zoom lenses of JP2011-075646A, JP3862117B, and JP3513264B, there is a problem that chromatic aberration is particularly deteriorated in a case where a part of lens groups in the zoom lens is replaced with an extender lens.

The present disclosure has been accomplished in consideration of the above-described situation, and an object of the present disclosure is to provide a zoom lens, an extender lens, and an imaging apparatus, which reduce chromatic aberration while favorably correcting focal position misalignment with change in temperature at the time of replacement with an extender lens.

Specific means for solving the above-described problem include the following aspects.

<1> A zoom lens having, in order from an object side, a focusing unit including a focusing lens group moving for focusing, a variable magnification unit including at least two variable magnification lens groups moving while changing a mutual interval for variable magnification, an aperture stop, and an image forming unit including an image forming lens group, in which the image forming unit consists of, in order from the object side, an M1 lens group, an M2N lens group, and an M3 lens group, the M2N lens group is replaceable with an M2E lens group that enlarges an image forming magnification, in a case where an Abbe number of a positive lens of the M2E lens group is $vd1$, an average value of temperature change coefficients from 0° C. to 40° C. of a refractive index with respect to d line in the air is $dn/dt$, and $dn/dt$ of the positive lens of the M2E lens group is $dn/dt1$, the M2E lens group comprises at least one positive lens satisfying conditional expressions (1) and (2), and in a case where an average value of $dn/dt$ of the positive lenses of the M2E lens group is $dn/dt\_ave\_P$, and an average value of $dn/dt$ of negative lenses of the M2E lens group is $dn/dt\_ave\_N$, conditional expressions (3) and (4) are satisfied.

$$55 < vd1 \tag{1}$$

$$5.5 < dn/dt1 < 10 \tag{2}$$

$$3.5 < dn/dt\_ave\_P < 6 \tag{3}$$

$$1.5 < dn/dt\_ave\_N < 6 \tag{4}$$

<2> The zoom lens of <1>, in which, in a case where a partial dispersion ratio of the positive lens of the M2E lens group between g line and F line is $\theta gF$, the at least one positive lens satisfying the conditional expressions (1) and (2) satisfies a conditional expression (5).

$$0.62 < \theta gF + 0.001625 \times vd1 < 0.67 \tag{5}$$

<3> The zoom lens of <1> or <2>, in which, in a case where a partial dispersion ratio of the positive lens of the M2E lens group between g line and F line is $\theta gF$, and an average value of $(\theta gF + 0.001625 \times vd1)$ of the positive lenses of the M2E lens group is $(\theta gF + 0.001625 \times vd1)\_ave\_P$, a conditional expression (6) is satisfied.

$$0.62 < (\theta gF + 0.001625 \times vd1)\_ave\_P < 0.67 \tag{6}$$

<4> The zoom lens of any one of <1> to <3>, in which, in a case where an average value of refractive indexes of the negative lenses of the M2E lens group is $nd\_ave\_N$, and an average value of refractive indexes of the positive lenses of the M2E lens group is $nd\_ave\_P$, a conditional expression (7) is satisfied.

$$0.01 < nd\_ave\_N - nd\_ave\_P < 0.2 \tag{7}$$

<5> The zoom lens of any one of <1> to <4>, in which the M2E lens group comprises at least three cemented lenses each comprising at least one positive lens and at least one negative lens.

<6> The zoom lens of <5>, in which, in a case where an Abbe number for d line of the positive lens composing the cemented lens of the M2E lens group is $vd\_P1$, an Abbe number for d line of the positive lens composing the cemented lens of the M2E lens group is $vd\_P2$, an Abbe number for d line of the negative lens composing the cemented lens of the M2E lens group is $vd\_N1$, and an Abbe number for d line of the negative lens composing the cemented lens of the M2E lens group is $vd\_N2$, at least two of the cemented lenses in the M2E lens group satisfy a conditional expression (8), and at least one of the cemented lenses in the M2E lens group satisfies a conditional expression (9).

$$10 < vd\_P1 - vd\_N1 < 30 \tag{8}$$

$$10 < vd\_N2 - vd\_P2 < 35 \tag{9}$$

In regards to the conditional expressions (8) and (9), in a case where the cemented lens includes a plurality of positive lenses, a positive lens having the highest absolute value of a refractive power in the cemented lens is used in the calculation of the conditional expressions. Similarly, in a case where the cemented lens includes a plurality of negative lenses, a negative lens having the highest absolute value of a refractive power in the cemented lens is used in the calculation of the conditional expressions.

<7> The zoom lens of <5> or <6>, in which the M2E lens group consists of, in order from the object side, the three cemented lenses, and a negative meniscus lens concave toward the object side.

<8> The zoom lens of any one of <1> to <7>, in which the focusing lens group has a positive refractive power, the variable magnification unit consists of, in order from the object side, a V1 lens group having a negative refractive power, a V2 lens group having a positive refractive power, and a V3 lens group having a positive refractive power, the image forming unit has a positive refractive power, and at the time of variable magnification from a wide angle end to a telephoto end, the V1 lens group and a combined group consisting of the V2 lens group and the V3 lens group simultaneously pass through points where a lateral magnification is −1.

<9> The zoom lens of any one of <1> to <8>, in which the M1 lens group has a negative refractive power, and the M2E lens group and the M3 lens group have a positive refractive power.

<10> The zoom lens of <1>, in which the positive lens satisfying the conditional expressions (1) and (2) satisfies at least one of a conditional expression (1-1) or (2-1).

$$55 < vd1 < 70 \quad (1\text{-}1)$$

$$5.75 < dn/dt1 < 8.5 \quad (2\text{-}1)$$

<11> The zoom lens of <1>, in which the positive lens satisfying the conditional expressions (1) and (2) satisfies at least one of a conditional expression (1-2) or (2-2).

$$55 < vd1 < 60 \quad (1\text{-}2)$$

$$6 < dn/dt1 < 7.5 \quad (2\text{-}2)$$

<12> The zoom lens of <1>, in which at least one of a conditional expressions (3-1) or (4-1) is satisfied.

$$3.75 < dn/dt\_ave\_P < 5.5 \quad (3\text{-}1)$$

$$2 < dn/dt\_ave\_N < 5 \quad (4\text{-}1)$$

<13> The zoom lens of <1>, in which a conditional expression (3-2) is satisfied.

$$4 < dn/dt\_ave\_P < 5 \quad (3\text{-}2)$$

<14> The zoom lens of <2>, in which the at least one positive lens satisfying the conditional expressions (1) and (2) satisfies a conditional expression (5-1).

$$0.63 < \theta gF + 0.001625 \times vd1 < 0.66 \quad (5\text{-}1)$$

<15> The zoom lens of <3>, in which a conditional expression (6-1) is satisfied.

$$0.63 < (\theta gF + 0.001625 \times vd1)\_ave\_P < 0.66 \quad (6\text{-}1)$$

<16> The zoom lens of <4>, in which a conditional expression (7-1) is satisfied.

$$0.01 < nd\_ave\_N - nd\_ave\_P < 0.15 \quad (7\text{-}1)$$

<17> The zoom lens of <6>, in which the at least two of the cemented lenses in the M2E lens group satisfy a conditional expression (8-1).

$$17 < vd\_P1 - vd\_N1 < 30 \quad (8\text{-}1)$$

<18> The zoom lens of <6>, in which the at least one of the cemented lenses in the M2E lens group satisfies a conditional expression (9-1).

$$17 < vd\_N2 - vd\_P2 < 35 \quad (9\text{-}1)$$

<19> An extender lens consisting of the M2E lens group in the zoom lens of any one of <1> to <18>.

<20> An imaging apparatus comprising a zoom lens of any one of <1> to <18>.

In the specification, it should be noted that the terms "consisting of ~" and "consists of ~" mean that not only the above-described constituent elements but also lenses substantially having no refractive power, optical elements, such as a stop, a filter, and a cover glass, other than lenses, and mechanism parts, such as a lens flange, a lens barrel, an imaging element, and a camera shake correction mechanism may be included.

In the specification, it should be noted that "~ group having a positive refractive power" means that the group has a positive refractive power as a whole. Similarly, "~ group having a negative refractive power" means that the group has a negative refractive power as a whole. The "lens having a positive refractive power" and the "positive lens" are synonymous. The "lens having a negative refractive power" and the "negative lens" are synonymous. The "lens group" does not necessarily consist of a plurality of lenses, but may consist of only one lens.

The values used in the conditional expressions are values for d line excluding the partial dispersion ratio. A partial dispersion ratio $\theta gF$ of a certain lens between g line and F line is defined as $\theta gF = (Ng-NF)/(NF-NC)$ in a case where refractive indexes of the lens with respect to g line, F line, and C line are Ng, NF, and NC, respectively. In the specification, "d line", "C line", "F line", and "g line" are bright lines, a wavelength of d line is 587.56 nanometers (nm), a wavelength of C line is 656.27 nanometers (nm), a wavelength of F line is 486.13 nanometers (nm), and a wavelength of g line is 435.84 nanometers (nm).

According to the present disclosure, it is possible to provide a zoom lens, an extender lens, and an imaging apparatus, which reduce chromatic aberration while favorably correcting focal position misalignment with change in temperature at the time of replacement with an extender lens.

DESCRIPTION OF THE PREFERRED EMBODIMENTS

Figure 1:
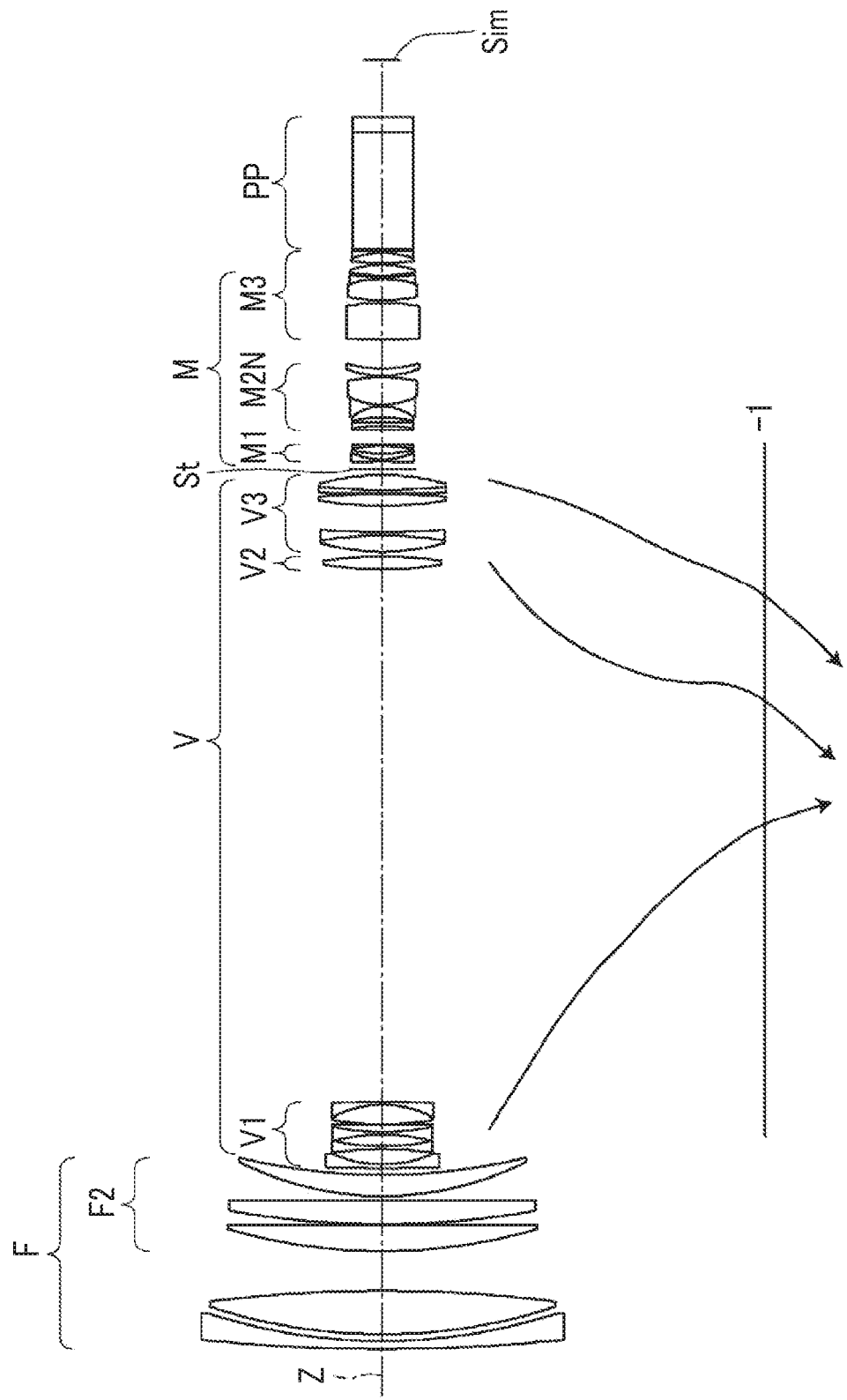
FIG. 1 is a cross-sectional view showing the configuration of a reference state of a zoom lens according to Example 1 of the invention.

Hereinafter, an embodiment of the invention will be described in detail referring to the drawings. A zoom lens of the embodiment is configured such that an M2N lens group M2N as a part of lens groups is insertable into and removable from an optical path, the M2N lens group M2N is replaced with an M2E lens group M2E as an extender lens, thereby enlarging an image forming magnification while maintaining a position of an image plane Sim constant. In the following description, a state in which the M2N lens group M2N is disposed in the zoom lens is referred to as reference state, and a state in which the M2N lens group M2N is replaced with the M2E lens group M2E as an extender lens is referred to as a replacement state.

Figure 2:
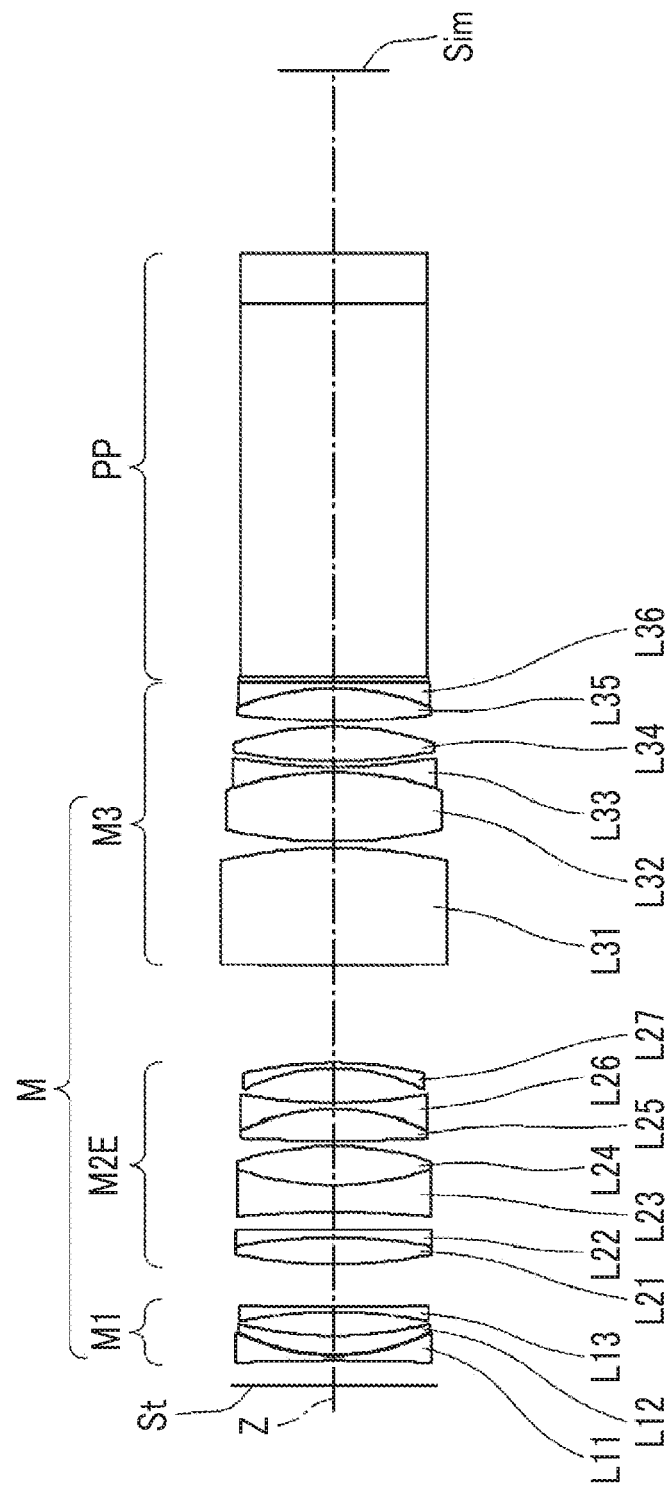
FIG. 2 is a cross-sectional view showing the configuration of an image forming unit and the vicinity thereof in a replacement state of the zoom lens according to Example 1 of the invention.

FIG. 1 is a cross-sectional view showing the configuration of a reference state at a wide angle end of a zoom lens according to an embodiment of the invention, and FIG. 2 is a cross-sectional view showing an image forming unit and the vicinity thereof in a replacement state of the zoom lens shown in FIG. 1. A configuration example shown in FIGS. 1 and 2 corresponds to a zoom lens according to Example 1 of the invention described below. In FIGS. 1 and 2, the left side is an object side, and a right side is an image side.

The zoom lens shown in FIG. 1 has, in order from the object side toward the image side along an optical axis Z, a focusing unit F including a focusing lens group F2 moving for focusing, a variable magnification unit V including at least two variable magnification lens groups moving while changing a mutual interval for variable magnification, an aperture stop St limiting an amount of light passing therethrough, and an image forming unit M including an image forming lens group. The zoom lens is configured such that a total length is invariable at the time of variable magnification.

The image forming unit M consists of, in order from the object side, an M1 lens group M1, an M2N lens group M2N, and an M3 lens group M3. The M2N lens group M2N is configured to be replaceable with an M2E lens group M2E as an extender lens that enlarges an image forming magnification of the entire system after replacement greater than an image forming magnification of the entire system before replacement.

In the example of FIGS. 1 and 2, an optical member PP that has an incidence surface and an emission surface perpendicular to the optical axis Z is disposed between the image forming unit M and the image plane Sim. The optical member PP is assumed to be various filters, a prism, a cover glass, and/or the like. In the invention, the optical member PP may be disposed at a position different from the position in the example of FIG. 1, or the optical member PP may be omitted. The aperture stop St shown in FIGS. 1 and 2 does not necessarily represent a size or a shape, and indicates a position on the optical axis Z.

In a case where an Abbe number of a positive lens of the M2E lens group M2E is vd1, an average value of temperature change coefficients from 0° C. to 40° C. of a refractive index with respect to d line in the air is dn/dt, and dn/dt of the positive lens of the M2E lens group M2E is dn/dt1, the M2E lens group M2E comprises at least one positive lens satisfying conditional expressions (1) and (2).

$$55 < vd1 \tag{1}$$

$$5.5 < dn/dt1 < 10 \tag{2}$$

The conditional expression (1) is satisfied, whereby it is possible to favorably correct primary chromatic aberration. In a case where at least one of a conditional expression (1-1) or (1-2) is satisfied, it is possible to obtain more favorable characteristics.

$$55 < vd1 < 70 \tag{1-1}$$

$$55 < vd1 < 60 \tag{1-2}$$

The conditional expression (2) is satisfied, whereby it is possible to favorably correct focal position misalignment at the time of extender lens (M2E lens group M2E) replacement with change in temperature. In particular, the M2E lens group M2E includes a positive lens made of a material simultaneously satisfying the conditional expressions (1) and (2), whereby it is possible to make a significant contribution to favorable correction of the primary chromatic aberration and favorable correction of the focal position misalignment at the time of the extender lens (M2E lens group M2E) replacement with the change in temperature, and to select a general material for other lenses. For this reason, it is possible to improve a degree of freedom of design. In a case where at least one of a conditional expression (2-1) or (2-2) is satisfied, it is possible to obtain more favorable characteristics.

$$5.75 < dn/dt1 < 8.5 \tag{2-1}$$

$$6 < dn/dt1 < 7.5 \tag{2-2}$$

In a case where an average value of dn/dt of the positive lenses of the M2E lens group M2E is dn/dt_ave_P, and an average value of dn/dt of negative lenses of the M2E lens group M2E is dn/dt_ave_N, a configuration in which conditional expressions (3) and (4) are satisfied is made.

$$3.5 < dn/dt\_ave\_P < 6 \tag{3}$$

$$1.5 < dn/dt\_ave\_N < 6 \tag{4}$$

The conditional expression (3) is satisfied, whereby it is possible to favorably correct the focal position misalignment at the time of the extender lens (M2E lens group M2E) replacement with the change in temperature. In a case where at least one of a conditional expressions (3-1) or (3-2) is satisfied, it is possible to obtain more favorable characteristics.

$$3.75 < dn/dt\_ave\_P < 5.5 \tag{3-1}$$

$$4 < dn/dt\_ave\_P < 5 \tag{3-2}$$

A conditional expression (4) is satisfied, whereby it is possible to favorably correct the focal position misalignment at the time of the extender lens (M2E lens group M2E) replacement with the change in temperature. In a case where a conditional expression (4-1) is satisfied, it is possible to obtain more favorable characteristics.

$$2 < dn/dt\_ave\_N < 5 \tag{4-1}$$

In the zoom lens according to the embodiment, it is preferable that at least one positive lens of the M2E lens group M2E satisfying the conditional expressions (1) and (2) satisfies a conditional expression (5) in a case where a partial dispersion ratio of the positive lens of the M2E lens group M2E between g line and F line is θgF. The positive lens of the M2E lens group M2E satisfying the conditional expressions (1) and (2) further satisfies the conditional expression (5), whereby it is possible to favorably correct primary and secondary longitudinal chromatic aberrations. In a case where a conditional expression (5-1) is satisfied, it is possible to obtain more favorable characteristics.

$$0.62 < \theta gF + 0.001625 \times vd1 < 0.67 \tag{5}$$

$$0.63 < \theta gF + 0.001625 \times vd1 < 0.66 \tag{5-1}$$

It is preferable that, in a case where the partial dispersion ratio of the positive lens of the M2E lens group M2E between g line and F line is θgF, and an average value of (θgF+0.001625×vd1) of the positive lenses of the M2E lens group M2E is (θgF+0.001625×vd1)_ave_P, a conditional expression (6) is satisfied. The conditional expression (6) is satisfied, whereby it is possible to further improve the effects of the conditional expressions (1) and (5). In a case where a conditional expression (6-1) is satisfied, it is possible to obtain more favorable characteristics.

$$0.62 < (\theta gF + 0.001625 \times vd1)\_ave\_P < 0.67 \tag{6}$$

$$0.63 < (\theta gF + 0.001625 \times vd1)\_ave\_P < 0.66 \tag{6-1}$$

It is preferable that, in a case where an average value of refractive indexes of the negative lenses of the M2E lens group M2E is nd_ave_N, and an average value of refractive indexes of the positive lenses of the M2E lens group M2E is nd_ave_P, a conditional expression (7) is satisfied. The result of the conditional expression (7) is prevented from being equal to or greater than an upper limit, whereby correction of spherical aberration is facilitated. The result of the conditional expression (7) is prevented from being equal to or less than a lower limit, whereby correction of a field curvature is facilitated. In a case where at least one of a conditional expression (7-1) or (7-2) is satisfied, it is possible to obtain more favorable characteristics.

$$0.01 < nd\_ave\_N - nd\_ave\_P < 0.2 \tag{7}$$

$$0.01 < nd\_ave\_N - nd\_ave\_P < 0.15 \tag{7-1}$$

$$0.01 < nd\_ave\_N - nd\_ave\_P < 0.1 \tag{7-2}$$

It is preferable that the M2E lens group M2E comprises at least three cemented lenses each comprising at least one positive lens and at least one negative lens. With such a configuration, it is possible to favorably correct chromatic aberration. Furthermore, it is possible to reduce a difference in spherical aberration depending on wavelengths. In addition, it is possible to suppress extension of a lens system total length.

It is preferable that, in a case where an Abbe number for d line of the positive lens composing the cemented lens of the M2E lens group M2E is vd_P1, an Abbe number for d line of the positive lens composing the cemented lens of the M2E lens group M2E is vd_P2, an Abbe number for d line of the negative lens composing the cemented lens of the M2E lens group M2E is vd_N1, and an Abbe number for d line of the negative lens composing the cemented lens of the M2E lens group M2E is vd_N2, at least two of the cemented lenses in the M2E lens group M2E satisfy a conditional expression (8), and at least one of the cemented lenses in the M2E lens group M2E satisfies a conditional expression (9). With such a configuration, it is possible to favorably correct chromatic aberration. Furthermore, it is possible to reduce a difference in spherical aberration depending on wavelengths. In a case where at least one of a conditional expression (8-1) or (8-2) is satisfied, it is possible to obtain more favorable characteristics. Similarly, in a case where at least one of a conditional expression (9-1) or (9-2) is satisfied, it is possible to obtain more favorable characteristics.

$$10 < vd\_P1 - vd\_N1 < 30 \tag{8}$$

$$17 < vd\_P1 - vd\_N1 < 30 \tag{8-1}$$

$$19 < vd\_P1 - vd\_N1 < 30 \tag{8-2}$$

$$10 < vd\_N2 - vd\_P2 < 35 \tag{9}$$

$$17 < vd\_N2 - vd\_P2 < 35 \tag{9-1}$$

$$19 < vd\_N2 - vd\_P2 < 35 \tag{9-2}$$

It is preferable that the M2E lens group M2E consists of, in order from the object side, three cemented lenses, and a negative meniscus lens concave toward the object side. In this way, the negative lens is disposed closest to the image side of the M2E lens group M2E, whereby enlargement of an image forming magnification is facilitated. Furthermore, the three cemented lenses are provided, whereby it is possible to favorably correct chromatic aberration. In addition, the negative meniscus lens concave toward the object side is provided, whereby it is possible to suppress the occurrence of astigmatism.

It is preferable that the focusing lens group F2 included in the focusing unit F has a positive refractive power, the variable magnification unit V consists of, in order from the object side, a V1 lens group V1 having a negative refractive power, a V2 lens group V2 having a positive refractive power, and a V3 lens group V3 having a positive refractive power, the image forming unit M has a positive refractive power, and at the time of variable magnification from a wide angle end to a telephoto end, the V1 lens group V1 and a combined group consisting of the V2 lens group V2 and the V3 lens group V3 simultaneously pass through a point where a lateral magnification is −1. In FIG. 1, movement trajectories of the V1 lens group V1, the V2 lens group V2, and the V3 lens group V3 at the time of variable magnification, and a position where the lateral magnification is −1 are shown.

In this way, a floating system in which the two groups of the V2 lens group V2 and the V3 lens group V3 having a positive refractive power correct image plane fluctuation with variable magnification with respect to the V1 lens group V1 of the variable magnification unit V having a negative refractive power, and the V2 lens group V2 and the V3 lens group V3 are relatively moved is employed, whereby it is possible to favorably correct fluctuation in spherical aberration at the time of variable magnification along with correction of fluctuation the image plane at the time of variable magnification.

It is preferable that the M1 lens group M1 has a negative refractive power, and the M2E lens group M2E and the M3 lens group M3 have a positive refractive power. In this way, the M1 lens group M1 having a negative refractive power is disposed closest to the object side of the image forming unit M, whereby it is possible to easily secure a back focus. The positive refractive power of the image forming unit M is shared by the M2E lens group M2E and the M3 lens group M3, whereby it is possible to suppress the occurrence of aberrations.

In the example shown in FIG. 1, although third, fourth, and fifth lenses of the focusing unit F from the object side compose the focusing lens group F2, a lens group different from the example can be employed as the focusing lens group. Similarly, in the zoom lens of the invention, the number of variable magnification lens groups included in the variable magnification unit V can be a number different from that in the example shown in FIG. 1.

The above-described preferred configurations and available configurations may be optionally combinations, and it is preferable that the configurations are selectively employed according to required specification.

Next, numerical examples of the zoom lens of the invention will be described.

Example 1 (Reference State)

The configuration of a zoom lens in a reference state of Example 1 is shown in FIG. 1. An illustration method of FIG. 1 is described above, and thus, overlapping description will be partially omitted.

The zoom lens in the reference state of Example 1 is composed of, in order from the object side toward the image side along the optical axis Z, a focusing unit F including a focusing lens group F2 moving for focusing, a variable magnification unit V consisting of a V1 lens group V1, a V2 lens group V2, and a V3 lens group V3 moving while changing a mutual interval for variable magnification, an aperture stop St limiting an amount of light passing therethrough, and an image forming unit M consisting of an M1 lens group M1, an M2N lens group M2N, and an M3 lens group M3.

Basic lens data of the zoom lens in the reference state of Example 1 is shown in Tables 1A and 1B, data relating to specifications is shown in Table 2, data relating to variable surface distances is shown in Table 3, and data relating to aspheric coefficients is shown in Table 4.

In lens data of Table 1, the column of a surface number shows a surface number when a surface of a constituent element closest to the object side is regarded as a first surface and the surface number sequentially increases toward the image side, the column of a radius of curvature shows a radius of curvature of each surface, and the column of a surface distance shows a distance on the optical axis Z between each surface and a next surface. The column of n shows a refractive index of each optical element with respect to d line (a wavelength 587.56 nm), the column of ν shows an Abbe number of each optical element with respect to d line (a wavelength of 587.56 nm), the column of θgF shows a partial dispersion ratio of each optical element between g line (a wavelength of 435.84 nm) and F line (a wavelength of 486.13 nm), and the column of dn/dt shows an average value of temperature change coefficients from 0° C. to 40° C. of a refractive index of each optical element with respect to d line (a wavelength of 587.56 nm) in the air.

The sign of the radius of curvature is positive in a case where the surface shape is convex toward the object side, and is negative in a case where the surface shape is convex toward the image side. Basic lens data also includes the aperture stop St and the optical member PP. Text reading (stop) is described along with the surface number in the column of the surface number of the surface corresponding to the aperture stop St. Text reading (NOR) is described along with the surface number in the column of the surface number of the surface corresponding to the M2N lens group M2N. In lens data of Table 1, DD[surface number] is described in the column of the surface distance that changes at the time of variable magnification. A numerical value corresponding to DD[surface number] is shown in Table 3.

In data relating to specifications of Table 2, values of a zoom magnification, a focal length f, an F number FNo., and a full angle of view 2ω(°) are shown.

In lens data of Table 1, mark * is attached to the surface number of each aspheric surface, and a numerical value of a paraxial radius of curvature is shown as the radius of curvature of the aspheric surface. In data relating to the aspheric coefficients in Table 4, the surface numbers of the aspheric surfaces and the aspheric coefficients relating to the aspheric surfaces are shown. "E±n" (where n: integer) in the numerical values of the aspheric coefficients of Table 4 means "×10±n". The aspheric coefficients are the values of coefficients KA and Am in an aspheric surface expression represented by the following expression.

$$Zd = C \cdot h^2 / \{1 + (1 - KA \cdot C^2 \cdot h^2)^{1/2}\} \Sigma Am \cdot h^m$$

where

Zd: an aspheric surface depth (a length of a vertical line from a point on an aspheric surface at height h to a plane perpendicular to the optical axis in contact with an aspheric surface apex)

h: a height (a distance from the optical axis)

C: a reciprocal of a paraxial radius of curvature

KA, Am: aspheric coefficients

Σ at the aspheric surface depth Zd means a sum relating to m.

In basic lens data and data relating to specifications, although ° is used as the unit of angle and millimeter (mm) is used as the unit of length, other appropriate units may be used since optical systems are usable even if the optical systems are proportionally enlarged or proportionally reduced.

TABLE 1A

Example 1 (Reference State) - Lens Data (n and ν are based on d line)

| Surface Number | Radius of Curvature | Surface Distance | n | ν | θgF | dn/dt |
|---|---|---|---|---|---|---|
| 1 | 955.81543 | 4.400 | 1.83400 | 37.21 | 0.58082 | 9.17 |
| 2 | 302.25870 | 3.644 | | | | |
| 3 | 297.42207 | 23.792 | 1.43387 | 95.18 | 0.53733 | −9.94 |
| 4 | −722.93744 | 22.015 | | | | |
| 5 | 296.36518 | 14.584 | 1.43387 | 95.18 | 0.53733 | −9.94 |
| 6 | ∞ | 0.120 | | | | |
| 7 | 476.16920 | 12.551 | 1.43387 | 95.18 | 0.53733 | −9.94 |
| 8 | ∞ | 2.750 | | | | |
| 9 | 171.21493 | 11.514 | 1.43875 | 94.94 | 0.53433 | −6.58 |
| 10 | 322.66349 | DD[10] | | | | |
| *11 | 1060.94223 | 2.000 | 2.00069 | 25.46 | 0.61364 | 3.80 |
| 12 | 64.68717 | 8.453 | | | | |
| 13 | −163.08241 | 1.500 | 1.78800 | 47.37 | 0.55598 | 4.46 |
| 14 | 118.42396 | 6.286 | | | | |
| 15 | −103.99855 | 1.512 | 1.73400 | 51.47 | 0.54874 | 5.96 |
| 16 | 129.96228 | 4.079 | 1.89286 | 20.36 | 0.63944 | 1.15 |
| 17 | 1710.87635 | 0.120 | | | | |
| 18 | 181.47743 | 10.158 | 1.80518 | 25.42 | 0.61616 | 1.24 |
| 19 | −56.50189 | 1.610 | 1.80400 | 46.53 | 0.55775 | 4.51 |
| 20 | −477.82923 | DD[20] | | | | |
| 21 | 212.18454 | 6.985 | 1.43700 | 95.10 | 0.53364 | −6.14 |
| *22 | −213.88627 | DD[22] | | | | |
| 23 | 122.76002 | 8.725 | 1.43700 | 95.10 | 0.53364 | −6.14 |
| 24 | −213.35733 | 1.885 | 1.59270 | 35.31 | 0.59336 | 0.20 |
| 25 | 431.03082 | 14.389 | | | | |
| *26 | 181.89382 | 6.303 | 1.43700 | 95.10 | 0.53364 | −6.14 |
| 27 | −418.50132 | 0.179 | | | | |

TABLE 1A-continued

Example 1 (Reference State) - Lens
Data (n and ν are based on d line)

| Surface Number | Radius of Curvature | Surface Distance | n | ν | θgF | dn/dt |
|---|---|---|---|---|---|---|
| 28 | 620.24327 | 1.875 | 1.84666 | 23.78 | 0.62054 | 1.38 |
| 29 | 276.42951 | 8.433 | 1.43700 | 95.10 | 0.53364 | −6.14 |
| 30 | −118.94996 | DD[30] | | | | |

TABLE 1B

Example 1 (Reference State) - Lens
Data (n and ν are based on d line)

| Surface Number | Radius of Curvature | Surface Distance | n | ν | θgF | dn/dt |
|---|---|---|---|---|---|---|
| 31 (Stop) | ∞ | 4.338 | | | | |
| 32 | −472.78842 | 0.875 | 1.59522 | 67.73 | 0.54426 | −5.84 |
| 33 | 37.79609 | 0.120 | | | | |
| 34 | 37.07247 | 3.277 | 1.84139 | 24.56 | 0.61274 | 11.06 |
| 35 | 69.41856 | 4.015 | | | | |
| 36 | −82.56395 | 0.875 | 1.56732 | 42.82 | 0.57309 | 2.87 |
| 37 | 905.88105 | 7.500 | | | | |
| 38 (NOR) | 1284.12207 | 2.573 | 1.80400 | 46.53 | 0.55775 | 4.51 |
| 39 (NOR) | −109.09985 | 2.000 | 1.80518 | 25.42 | 0.61616 | 1.24 |
| 40 (NOR) | −9005.24276 | 2.481 | | | | |
| 41 (NOR) | −95.47382 | 6.235 | 1.74950 | 35.33 | 0.58189 | 5.39 |
| 42 (NOR) | −25.96179 | 0.885 | 1.71700 | 47.93 | 0.56062 | −0.10 |
| 43 (NOR) | 40.35994 | 15.010 | 1.51823 | 58.90 | 0.54567 | 0.79 |
| 44 (NOR) | −82.26735 | 0.730 | | | | |
| 45 (NOR) | 51.46806 | 3.925 | 1.84666 | 23.78 | 0.62054 | 1.38 |
| 46 (NOR) | 69.32553 | 16.419 | | | | |
| 47 | 562.41538 | 19.985 | 1.56883 | 56.36 | 0.54890 | 1.84 |
| 48 | −92.64291 | 1.190 | | | | |
| 49 | 88.31713 | 11.717 | 1.56883 | 56.36 | 0.54890 | 1.84 |
| 50 | −56.75558 | 0.875 | 1.91082 | 35.25 | 0.58224 | 5.28 |
| 51 | 101.81604 | 0.976 | | | | |
| 52 | 91.40555 | 5.878 | 1.43875 | 94.66 | 0.53402 | −6.11 |
| 53 | −54.68374 | 0.969 | | | | |
| 54 | 152.37116 | 5.561 | 1.67270 | 32.10 | 0.59891 | 3.00 |
| 55 | −44.68980 | 0.875 | 1.90366 | 31.31 | 0.59481 | 4.05 |
| 56 | 1213.00724 | 0.250 | | | | |
| 57 | ∞ | 1.000 | 1.51633 | 64.14 | 0.53531 | 2.71 |
| 58 | ∞ | 0.000 | | | | |
| 59 | ∞ | 63.000 | 1.60863 | 46.60 | 0.56787 | 3.04 |
| 60 | ∞ | 8.500 | 1.51633 | 64.14 | 0.53531 | 2.71 |
| 61 | ∞ | 31.191 | | | | |

TABLE 2

Example 1 (Reference State) - Specifications (d line)

| | Wide Angle End | Telephoto End |
|---|---|---|
| Zoom Magnification | 1.0 | 44.1 |
| f | 15.545 | 685.524 |
| FNo. | 2.65 | 4.08 |
| 2ω [°] | 65.2 | 1.6 |

TABLE 3

Example 1 (Reference State) - Variable Surface Distances

| | Wide Angle End | Telephoto End |
|---|---|---|
| DD[10] | 3.654 | 180.163 |
| DD[20] | 291.030 | 2.597 |
| DD[22] | 2.632 | 4.896 |
| DD[30] | 3.068 | 112.728 |

TABLE 4

Example 1 (Reference State) - Aspheric Coefficients

| | Surface Number | | |
|---|---|---|---|
| | 11 | 22 | 26 |
| KA | 6.1978006E+00 | 9.9811835E−01 | 8.2319259E−01 |
| A4 | −1.4915236E−07 | 5.2907942E−08 | −4.0509620E−07 |
| A6 | 6.4827892E−11 | −1.2354133E−11 | −2.9427118E−11 |
| A8 | −1.4741822E−13 | 4.2784259E−14 | 7.2110843E−14 |
| A10 | −1.2435995E−15 | 2.6139930E−16 | 5.3167732E−17 |
| A12 | 9.0133614E−18 | −1.0584003E−18 | −3.8116634E−19 |
| A14 | −2.4647889E−20 | 1.7619520E−21 | 5.5059948E−22 |
| A16 | 3.3970964E−23 | −1.5486781E−24 | −3.3979539E−25 |
| A18 | −2.3532161E−26 | 7.0338723E−28 | 7.5180737E−29 |
| A20 | 6.5242517E−30 | −1.2968942E−31 | 2.3751904E−33 |

Figure 4:
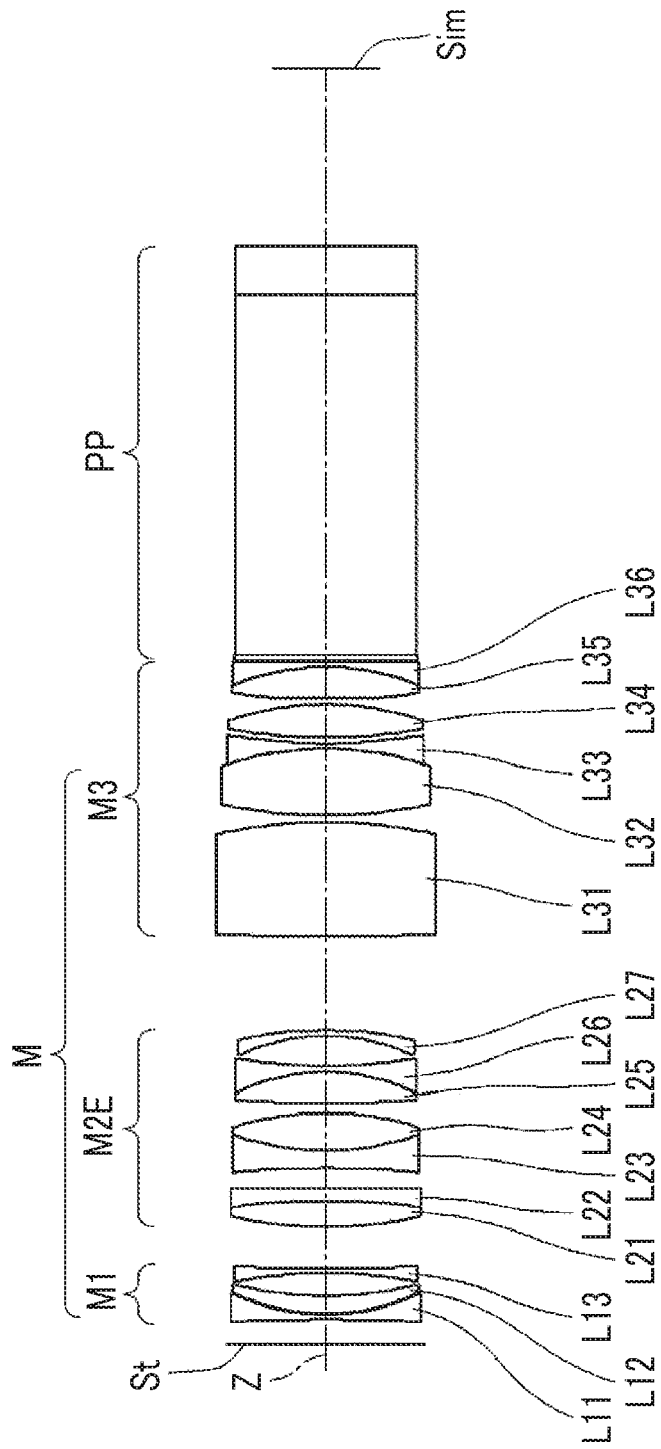
FIG. 4 is a cross-sectional view showing the configuration of an image forming unit and the vicinity thereof in a replacement state of the zoom lens according to Example 3 of the invention.
Figure 5:
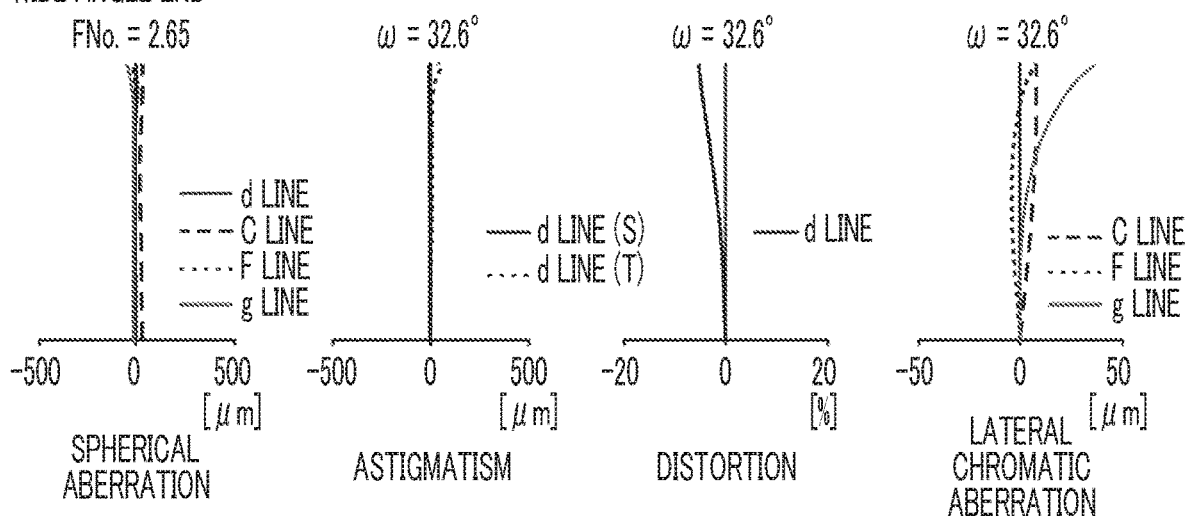
FIG. 5 shows respective aberration diagrams of the reference state of the zoom lens according to Example 1 of the invention.
Figure 5:
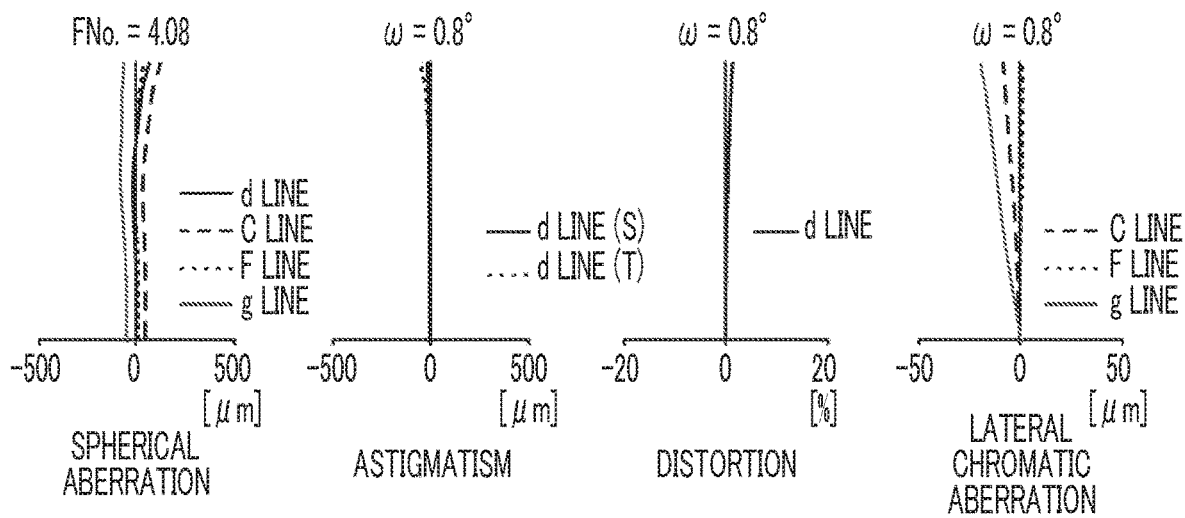

FIG. 4 shows respective aberration diagrams in a state in which the zoom lens in the reference state of Example 1 is focused on an object at infinity. FIG. 5 shows spherical aberration, astigmatism, distortion, and lateral chromatic aberration (chromatic aberration of magnification) in order from the left side. In FIG. 4, aberration diagrams at the wide angle end are shown on the upper side, and aberration diagrams at the telephoto end are shown on the lower side. In the spherical aberration diagram, aberrations relating to d line (a wavelength of 587.56 nm), C line (a wavelength of 656.27 nm), F line (a wavelength of 486.13 nm), and g line (a wavelength of 435.84 nm) are indicated by a solid line, a long broken line, a short broken line, and a gray solid line, respectively. In the astigmatism diagram, aberration relating to d line in a sagittal direction is indicated by a solid line, and aberration relating to d line in a tangential direction is indicated by a short broken line. In the distortion diagram, aberration relating to d line is indicated by a solid line. In the lateral chromatic aberration diagram, aberrations relating to C line, F line, and g line are indicated by a long broken line, a short broken line, and a gray solid line, respectively. In the spherical aberration diagram, FNo. means an F number, and in other aberration diagrams, ω means a half angle of view.

The symbols, the meanings, and the description methods of data used in the description of Example 1 (Reference State) described above will apply to Example 1 (Replacement State), Example 2 (Reference state), and Example 3 (Reference state) described below unless otherwise specifically described, and thus, overlapping description will be omitted.

Example 1 (Replacement State)

The configuration of the image forming unit M and the vicinity thereof in the replacement state of the zoom lens of Example 1 is shown in FIG. 2. In the replacement state, the M2N lens group M2N is replaced with the M2E lens group M2E as an extender lens.

In the replacement state, the image forming unit M is composed of an M1 lens group M1 that consists of three lenses of lenses L11 to L13, an M2E lens group M2E that consists of seven lenses of lenses L21 to L27, and an M3 lens group M3 that consists of six lenses of lenses L31 to L36.

Figure 6:
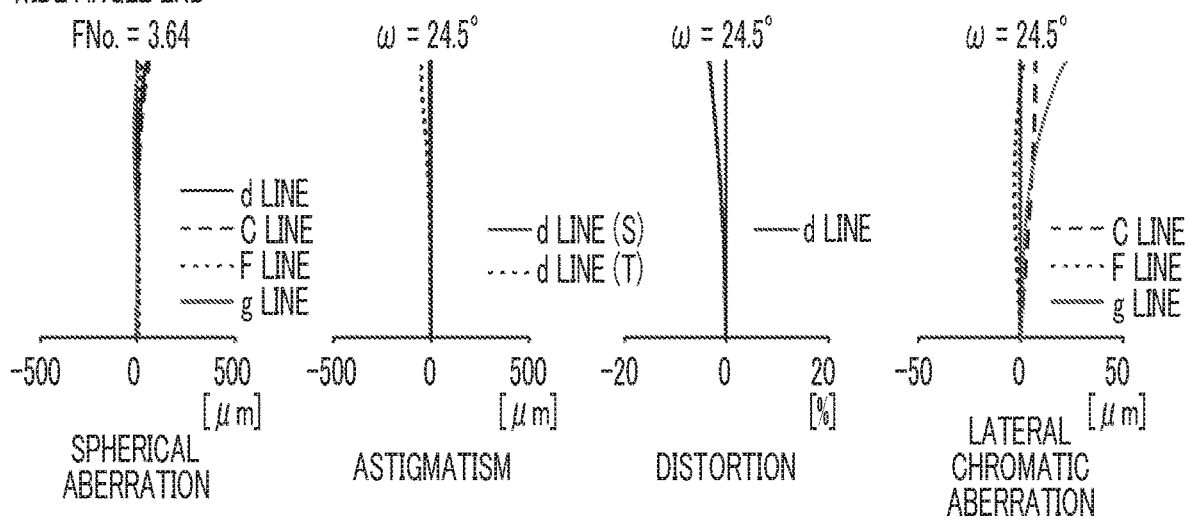
FIG. 6 shows respective aberration diagrams of the replacement state of the zoom lens according to Example 1 of the invention.
Figure 6:
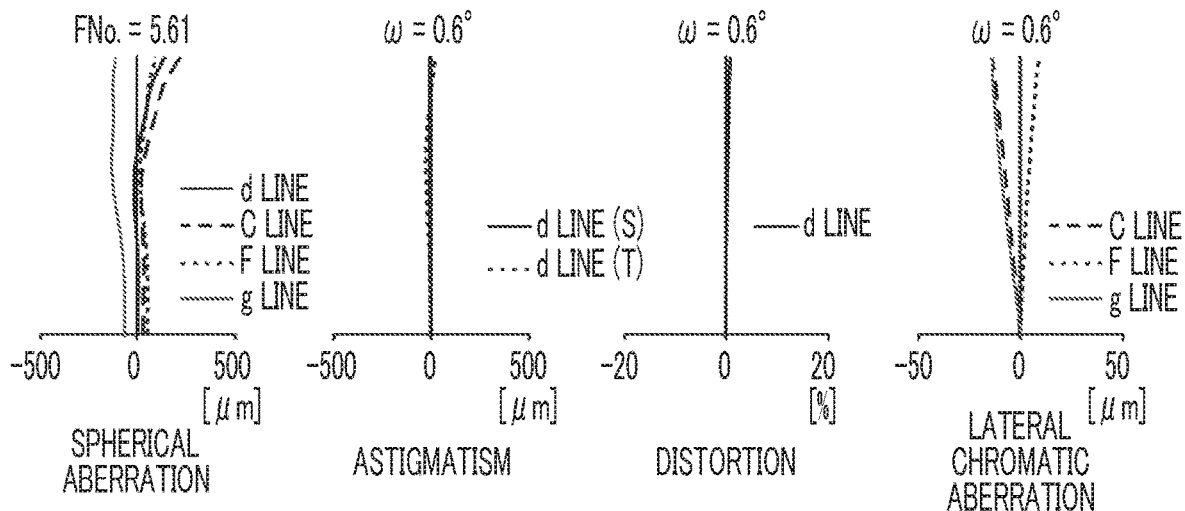

In regard to the zoom lens in the replacement state of Example 1, basic lens data is shown in Tables 5A and 5B, data relating to specifications is shown in Table 6, data relating to variable surface distances is shown in Table 7, and data relating to aspheric coefficients is shown in Table 8. In basic lens data of Table 5, text reading (EXT) is described in the column of the surface number of the surface corresponding to the M2E lens group M2E along with the surface number. Respective aberration diagrams in the replacement state are shown in FIG. 6.

TABLE 5A

Example 1 (Replacement State) - Lens Data (n and ν are based on d line)

| Surface Number | Radius of Curvature | Surface Distance | n | ν | θgF | dn/dt |
|---|---|---|---|---|---|---|
| 1 | 955.81543 | 4.400 | 1.83400 | 37.21 | 0.58082 | 9.17 |
| 2 | 302.25870 | 3.644 | | | | |
| 3 | 297.42207 | 23.792 | 1.43387 | 95.18 | 0.53733 | −9.94 |
| 4 | −722.93744 | 22.015 | | | | |
| 5 | 296.36518 | 14.584 | 1.43387 | 95.18 | 0.53733 | −9.94 |
| 6 | ∞ | 0.120 | | | | |
| 7 | 476.16920 | 12.551 | 1.43387 | 95.18 | 0.53733 | −9.94 |
| 8 | ∞ | 2.750 | | | | |
| 9 | 171.21493 | 11.514 | 1.43875 | 94.94 | 0.53433 | −6.58 |
| 10 | 322.66349 | DD[10] | | | | |
| *11 | 1060.94223 | 2.000 | 2.00069 | 25.46 | 0.61364 | 3.80 |
| 12 | 64.68717 | 8.453 | | | | |
| 13 | −163.08241 | 1.500 | 1.78800 | 47.37 | 0.55598 | 4.46 |
| 14 | 118.42396 | 6.286 | | | | |
| 15 | −103.99855 | 1.512 | 1.73400 | 51.47 | 0.54874 | 5.96 |
| 16 | 129.96228 | 4.079 | 1.89286 | 20.36 | 0.63944 | 1.15 |
| 17 | 1710.87635 | 0.120 | | | | |
| 18 | 181.47743 | 10.158 | 1.80518 | 25.42 | 0.61616 | 1.24 |
| 19 | −56.50189 | 1.610 | 1.80400 | 46.53 | 0.55775 | 4.51 |
| 20 | −477.82923 | DD[20] | | | | |
| 21 | 212.18454 | 6.985 | 1.43700 | 95.10 | 0.53364 | −6.14 |
| *22 | −213.88627 | DD[22] | | | | |
| 23 | 122.76002 | 8.725 | 1.43700 | 95.10 | 0.53364 | −6.14 |
| 24 | −213.35733 | 1.885 | 1.59270 | 35.31 | 0.59336 | 0.20 |
| 25 | 431.03082 | 14.389 | | | | |
| *26 | 181.89382 | 6.303 | 1.43700 | 95.10 | 0.53364 | −6.14 |
| 27 | −418.50132 | 0.179 | | | | |
| 28 | 620.24327 | 1.875 | 1.84666 | 23.78 | 0.62054 | 1.38 |
| 29 | 276.42951 | 8.433 | 1.43700 | 95.10 | 0.53364 | −6.14 |
| 30 | −118.94996 | DD[30] | | | | |

TABLE 5B

Example 1 (Replacement State) - Lens Data (n and ν are based on d line)

| Surface Number | Radius of Curvature | Surface Distance | n | ν | θgF | dn/dt |
|---|---|---|---|---|---|---|
| 31 (Stop) | ∞ | 4.338 | | | | |
| 32 | −472.78842 | 0.875 | 1.59522 | 67.73 | 0.54426 | −5.84 |
| 33 | 37.79609 | 0.120 | | | | |
| 34 | 37.07247 | 3.277 | 1.84139 | 24.56 | 0.61274 | 11.06 |
| 35 | 69.41856 | 4.015 | | | | |
| 36 | −82.56395 | 0.875 | 1.56732 | 42.82 | 0.57309 | 2.87 |
| 37 | 905.88105 | 7.150 | | | | |
| 38 (EXT) | 81.06106 | 4.625 | 1.84850 | 43.79 | 0.56197 | 5.09 |
| 39 (EXT) | −91.50242 | 1.210 | 1.84666 | 23.78 | 0.62054 | 1.38 |
| 40 (EXT) | 1357.94546 | 3.051 | | | | |
| 41 (EXT) | −180.58186 | 4.618 | 1.75520 | 27.51 | 0.61033 | 2.10 |
| 42 (EXT) | 52.39094 | 6.567 | 1.56883 | 56.04 | 0.54853 | 6.56 |
| 43 (EXT) | −56.63778 | 0.875 | | | | |
| 44 (EXT) | 246.32872 | 5.347 | 1.84666 | 23.78 | 0.62054 | 1.38 |
| 45 (EXT) | −37.99381 | 1.010 | 1.74100 | 52.64 | 0.54676 | 4.28 |
| 46 (EXT) | 87.06766 | 5.847 | | | | |
| 47 (EXT) | −35.99464 | 1.000 | 1.81600 | 46.62 | 0.55682 | 5.21 |
| 48 (EXT) | −66.09774 | 16.458 | | | | |
| 49 | 562.41538 | 19.985 | 1.56883 | 56.36 | 0.54890 | 1.84 |
| 50 | −92.64291 | 1.190 | | | | |
| 51 | 88.31713 | 11.717 | 1.56883 | 56.36 | 0.54890 | 1.84 |
| 52 | −56.75558 | 0.875 | 1.91082 | 35.25 | 0.58224 | 5.28 |
| 53 | 101.81604 | 0.976 | | | | |
| 54 | 91.40555 | 5.878 | 1.43875 | 94.66 | 0.53402 | −6.11 |
| 55 | −54.68374 | 0.969 | | | | |
| 56 | 152.37116 | 5.561 | 1.67270 | 32.10 | 0.59891 | 3.00 |
| 57 | −44.68980 | 0.875 | 1.90366 | 31.31 | 0.59481 | 4.05 |
| 58 | 1213.00724 | 0.250 | | | | |

TABLE 5B-continued

Example 1 (Replacement State) - Lens Data (n and ν are based on d line)

| Surface Number | Radius of Curvature | Surface Distance | n | ν | θgF | dn/dt |
|---|---|---|---|---|---|---|
| 59 | ∞ | 1.000 | 1.51633 | 64.14 | 0.53531 | 2.71 |
| 60 | ∞ | 0.000 | | | | |
| 61 | ∞ | 63.000 | 1.60863 | 46.60 | 0.56787 | 3.04 |
| 62 | ∞ | 8.500 | 1.51633 | 64.14 | 0.53531 | 2.71 |
| 63 | ∞ | 31.207 | | | | |

TABLE 6

Example 1 (Replacement State) - Specifications (d line)

| | Wide Angle End | Telephoto End |
|---|---|---|
| Zoom Magnification | 1.0 | 44.1 |
| f | 21.332 | 940.733 |
| FNo. | 3.64 | 5.61 |
| 2ω [°] | 49.0 | 1.2 |

TABLE 7

Example 1 (Replacement State) - Variable Surface Distances

| | Wide Angle End | Telephoto End |
|---|---|---|
| DD[10] | 3.654 | 180.163 |
| DD[20] | 291.030 | 2.597 |
| DD[22] | 2.632 | 4.896 |
| DD[30] | 3.068 | 112.728 |

TABLE 8

Example 1 (Replacement State) - Aspheric Coefficients

| | Surface Number | | |
|---|---|---|---|
| | 11 | 22 | 26 |
| KA | 6.1978006E+00 | 9.9811835E−01 | 8.2319259E−01 |
| A4 | −1.4915224E−07 | 5.2907831E−08 | −4.0509607E−07 |
| A6 | 6.4823635E−11 | −1.2351694E−11 | −2.9429381E−11 |
| A8 | −1.4735762E−13 | 4.2763545E−14 | 7.2126869E−14 |
| A10 | −1.2440471E−15 | 2.6149052E−16 | 5.3108646E−17 |
| A12 | 9.0152752E−18 | −1.0586326E−18 | −3.8103995E−19 |
| A14 | −2.4652806E−20 | 1.7623072E−21 | 5.5043668E−22 |
| A16 | 3.3978454E−23 | −1.5490002E−24 | −3.3967084E−25 |
| A18 | −2.3538397E−26 | 7.0354666E−28 | 7.5128598E−29 |
| A20 | 6.5264371E−30 | −1.2972263E−31 | 2.3843894E−33 |

Example 2 (Replacement State)

Figure 3:
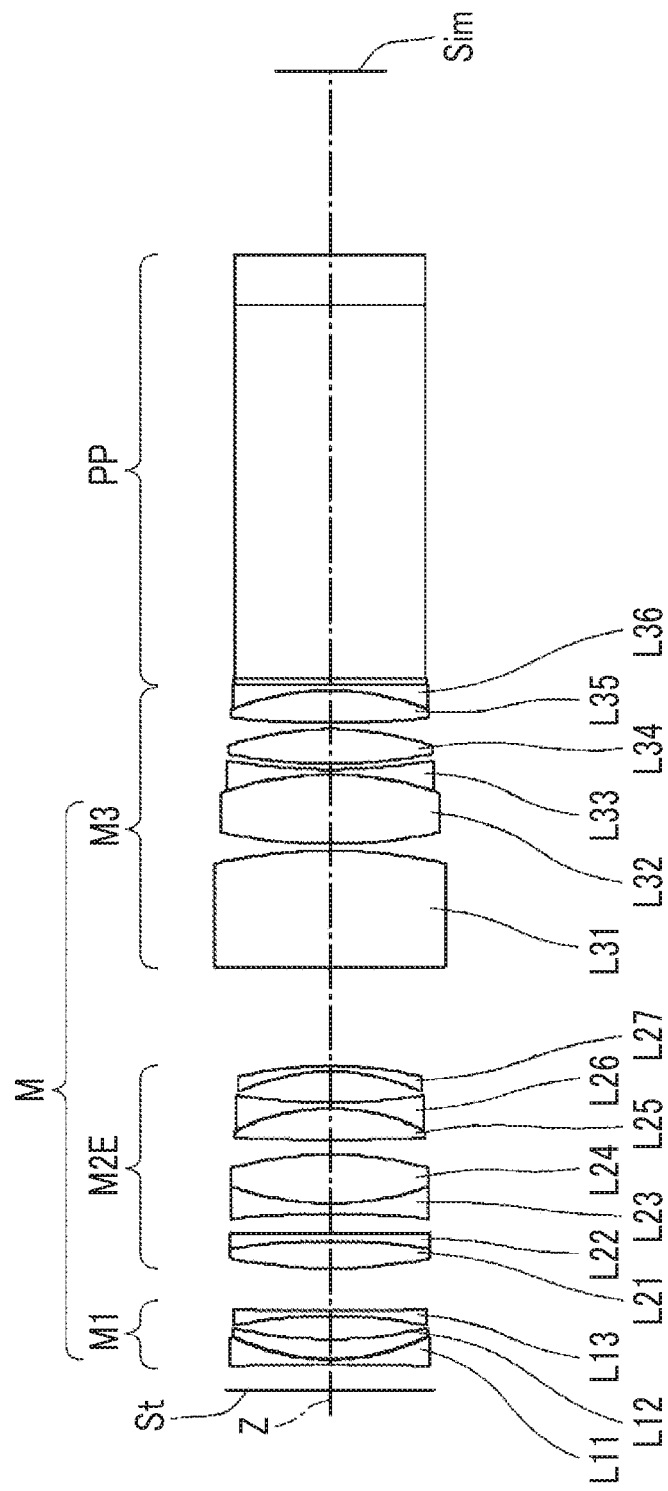
FIG. 3 is a cross-sectional view showing the configuration of an image forming unit and the vicinity thereof in a replacement state of the zoom lens according to Example 2 of the invention.
Figure 7:
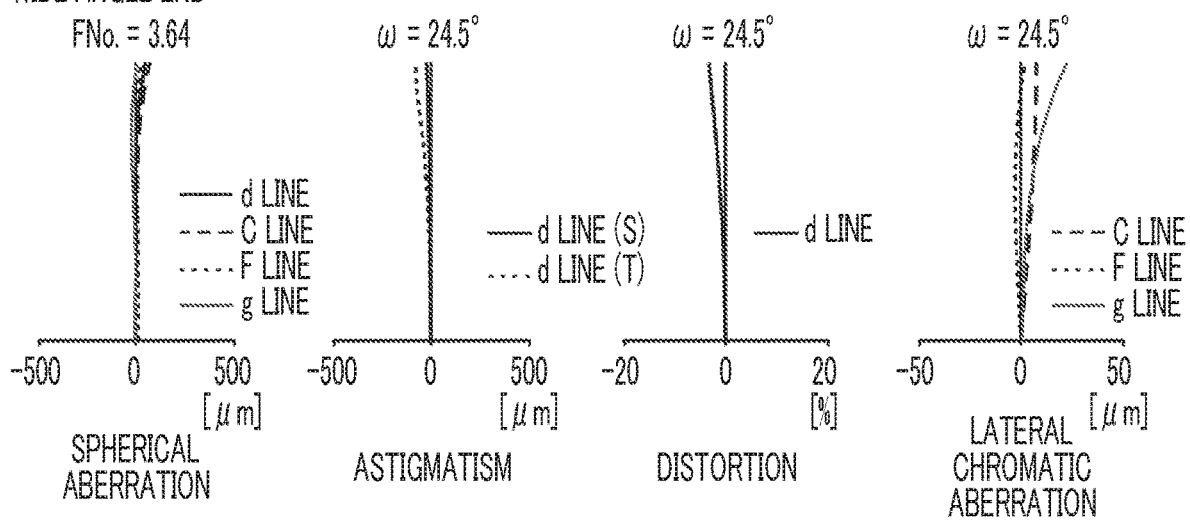
FIG. 7 shows respective aberration diagrams of the replacement state of the zoom lens according to Example 2 of the invention.
Figure 7:
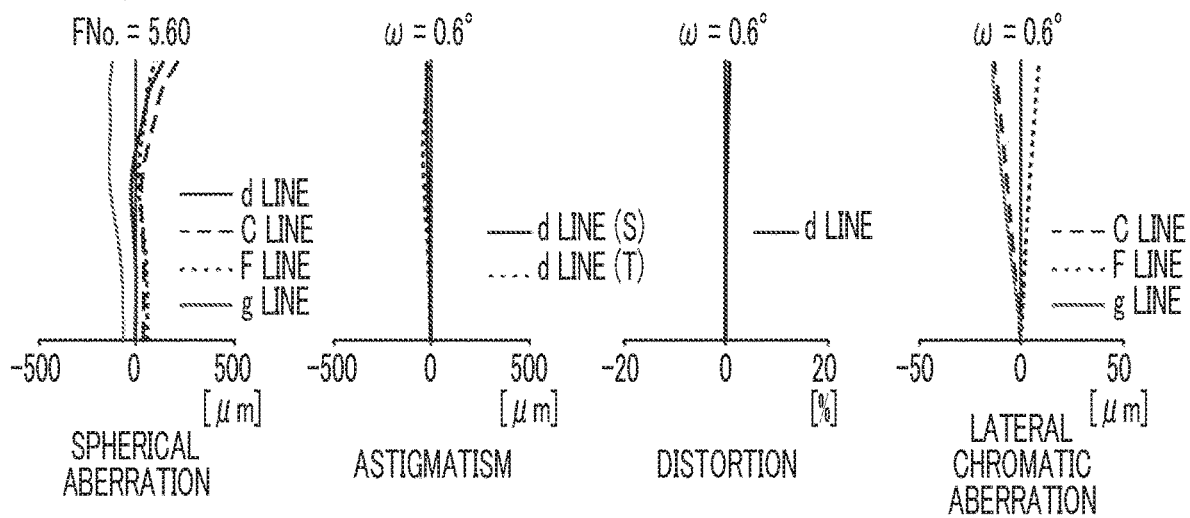

A zoom lens in a reference state of Example 2 has the same configuration as the zoom lens in the reference state of Example 1, and thus, description will be omitted. The configuration of the image forming unit M and the vicinity thereof in a replacement state of the zoom lens of Example 2 is shown in FIG. 3. The number of lenses of the image forming unit M in the replacement state is the same as in Example 1. In regard to the zoom lens in the replacement state of Example 2, basic lens data is shown in Tables 9A and 9B, data relating to specifications is shown in Table 10, data relating to variable surface distances is shown in Table 11, and data relating to aspheric coefficients is shown in Table 12. In basic lens data of Table 9, text reading (EXT) is described in the column of the surface number of the surface corresponding to the M2E lens group M2E along with the surface number. Respective aberration diagrams in the replacement state are shown in FIG. 7.

TABLE 9A

Example 2 (Replacement State) - Lens Data (n and ν are based on d line)

| Surface Number | Radius of Curvature | Surface Distance | n | ν | θgF | dn/dt |
|---|---|---|---|---|---|---|
| 1 | 955.81543 | 4.400 | 1.83400 | 37.21 | 0.58082 | 9.17 |
| 2 | 302.25870 | 3.644 | | | | |
| 3 | 297.42207 | 23.792 | 1.43387 | 95.18 | 0.53733 | −9.94 |
| 4 | −722.93744 | 22.015 | | | | |
| 5 | 296.36518 | 14.584 | 1.43387 | 95.18 | 0.53733 | −9.94 |
| 6 | ∞ | 0.120 | | | | |
| 7 | 476.16920 | 12.551 | 1.43387 | 95.18 | 0.53733 | −9.94 |
| 8 | ∞ | 2.750 | | | | |
| 9 | 171.21493 | 11.514 | 1.43875 | 94.94 | 0.53433 | −6.58 |
| 10 | 322.66349 | DD[10] | | | | |
| *11 | 1060.94223 | 2.000 | 2.00069 | 25.46 | 0.61364 | 3.80 |
| 12 | 64.68717 | 8.453 | | | | |
| 13 | −163.08241 | 1.500 | 1.78800 | 47.37 | 0.55598 | 4.46 |
| 14 | 118.42396 | 6.286 | | | | |
| 15 | −103.99855 | 1.512 | 1.73400 | 51.47 | 0.54874 | 5.96 |
| 16 | 129.96228 | 4.079 | 1.89286 | 20.36 | 0.63944 | 1.15 |
| 17 | 1710.87635 | 0.120 | | | | |
| 18 | 181.47743 | 10.158 | 1.80518 | 25.42 | 0.61616 | 1.24 |
| 19 | −56.50189 | 1.610 | 1.80400 | 46.53 | 0.55775 | 4.51 |
| 20 | −477.82923 | DD[20] | | | | |
| 21 | 212.18454 | 6.985 | 1.43700 | 95.10 | 0.53364 | −6.14 |
| *22 | −213.88627 | DD[22] | | | | |
| 23 | 122.76002 | 8.725 | 1.43700 | 95.10 | 0.53364 | −6.14 |
| 24 | −213.35733 | 1.885 | 1.59270 | 35.31 | 0.59336 | 0.20 |
| 25 | 431.03082 | 14.389 | | | | |
| *26 | 181.89382 | 6.303 | 1.43700 | 95.10 | 0.53364 | −6.14 |
| 27 | −418.50132 | 0.179 | | | | |
| 28 | 620.24327 | 1.875 | 1.84666 | 23.78 | 0.62054 | 1.38 |
| 29 | 276.42951 | 8.433 | 1.43700 | 95.10 | 0.53364 | −6.14 |
| 30 | −118.94996 | DD[30] | | | | |

TABLE 9B

Example 2 (Replacement State) - Lens Data (n and ν are based on d line)

| Surface Number | Radius of Curvature | Surface Distance | n | ν | θgF | dn/dt |
|---|---|---|---|---|---|---|
| 31 (Stop) | ∞ | 4.338 | | | | |
| 32 | −472.78842 | 0.875 | 1.59522 | 67.73 | 0.54426 | −5.84 |
| 33 | 37.79609 | 0.120 | | | | |
| 34 | 37.07247 | 3.277 | 1.84139 | 24.56 | 0.61274 | 11.06 |
| 35 | 69.41856 | 4.015 | | | | |
| 36 | −82.56395 | 0.875 | 1.56732 | 42.82 | 0.57309 | 2.87 |
| 37 | 905.88105 | 7.150 | | | | |
| 38 (EXT) | 84.75969 | 4.625 | 1.84850 | 43.79 | 0.56197 | 5.09 |
| 39 (EXT) | −108.22263 | 1.210 | 1.84667 | 23.79 | 0.61771 | 0.47 |
| 40 (EXT) | 1507.04052 | 3.352 | | | | |
| 41 (EXT) | −184.41706 | 1.815 | 1.80000 | 29.86 | 0.60231 | 3.42 |
| 42 (EXT) | 50.14177 | 8.291 | 1.65100 | 56.24 | 0.54210 | 6.60 |
| 43 (EXT) | −61.46694 | 2.500 | | | | |
| 44 (EXT) | 398.67162 | 5.096 | 1.84666 | 23.78 | 0.62054 | 1.38 |
| 45 (EXT) | −38.04934 | 1.010 | 1.75500 | 52.32 | 0.54757 | 4.17 |
| 46 (EXT) | 97.11226 | 5.250 | | | | |
| 47 (EXT) | −37.24283 | 1.000 | 1.84850 | 43.79 | 0.56197 | 5.09 |
| 48 (EXT) | −66.03774 | 16.458 | | | | |
| 49 | 562.41538 | 19.985 | 1.56883 | 56.36 | 0.54890 | 1.84 |
| 50 | −92.64291 | 1.190 | | | | |
| 51 | 88.31713 | 11.717 | 1.56883 | 56.36 | 0.54890 | 1.84 |
| 52 | −56.75558 | 0.875 | 1.91082 | 35.25 | 0.58224 | 5.28 |
| 53 | 101.81604 | 0.976 | | | | |
| 54 | 91.40555 | 5.878 | 1.43875 | 94.66 | 0.53402 | −6.11 |
| 55 | −54.68374 | 0.969 | | | | |
| 56 | 152.37116 | 5.561 | 1.67270 | 32.10 | 0.59891 | 3.00 |
| 57 | −44.68980 | 0.875 | 1.90366 | 31.31 | 0.59481 | 4.05 |
| 58 | 1213.00724 | 0.250 | | | | |

TABLE 9B-continued

Example 2 (Replacement State) - Lens Data (n and ν are based on d line)

| Surface Number | Radius of Curvature | Surface Distance | n | ν | θgF | dn/dt |
|---|---|---|---|---|---|---|
| 59 | ∞ | 1.000 | 1.51633 | 64.14 | 0.53531 | 2.71 |
| 60 | ∞ | 0.000 | | | | |
| 61 | ∞ | 63.000 | 1.60863 | 46.60 | 0.56787 | 3.04 |
| 62 | ∞ | 8.500 | 1.51633 | 64.14 | 0.53531 | 2.71 |
| 63 | ∞ | 31.203 | | | | |

TABLE 10

Example 2 (Replacement State) - Specifications (d line)

| | Wide Angle End | Telephoto End |
|---|---|---|
| Zoom Magnification | 1.0 | 44.1 |
| f | 21.324 | 940.402 |
| FNo. | 3.64 | 5.60 |
| 2ω [°] | 49.0 | 1.2 |

TABLE 11

Example 2 (Replacement State) - Variable Surface Distances

| | Wide Angle End | Telephoto End |
|---|---|---|
| DD[10] | 3.654 | 180.163 |
| DD[20] | 291.030 | 2.597 |
| DD[22] | 2.632 | 4.896 |
| DD[30] | 3.068 | 112.728 |

TABLE 12

Example 2 (Replacement State) - Aspheric Coefficients

| | Surface Number | | |
|---|---|---|---|
| | 11 | 22 | 26 |
| KA | 6.1978006E+00 | 9.9811835E−01 | 8.2319259E−01 |
| A4 | −1.4915236E−07 | 5.2907942E−08 | −4.0509620E−07 |
| A6 | 6.4827892E−11 | −1.2354133E−11 | −2.9427118E−11 |
| A8 | −1.4741822E−13 | 4.2784259E−14 | 7.2110843E−14 |
| A10 | −1.2435995E−15 | 2.6139930E−16 | 5.3167732E−17 |
| A12 | 9.0133614E−18 | −1.0584003E−18 | −3.8116634E−19 |
| A14 | −2.4647889E−20 | 1.7619520E−21 | 5.5059948E−22 |
| A16 | 3.3970964E−23 | −1.5486781E−24 | −3.3979539E−25 |
| A18 | −2.3532161E−26 | 7.0338723E−28 | 7.5180737E−29 |
| A20 | 6.5242517E−30 | −1.2968942E−31 | 2.3751904E−33 |

Example 3 (Replacement State)

Figure 8:
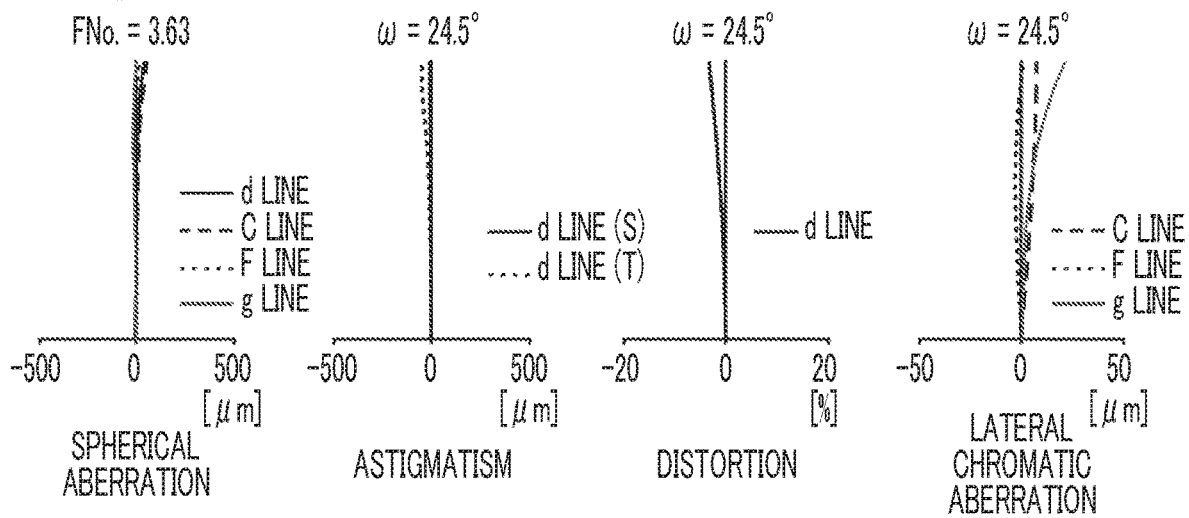
FIG. 8 shows respective aberration diagrams of the replacement state of the zoom lens according to Example 3 of the invention.
Figure 8:
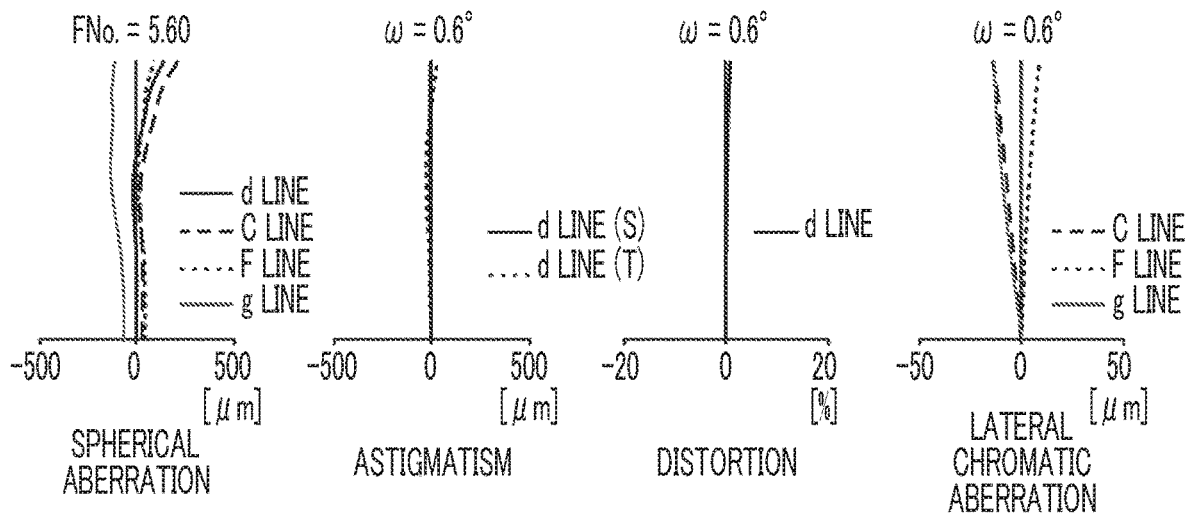

A zoom lens in a reference state of Example 3 has the same configuration as the zoom lens in the reference state of Example 1, and thus, description will be omitted. The configuration of the image forming unit M and the vicinity thereof in a replacement state of the zoom lens of Example 3 is shown in FIG. 4. The number of lenses of the image forming unit M in the replacement state is the same as in Example 1. In regard to the zoom lens in the replacement state of Example 3, basic lens data is shown in Tables 13A and 13B, data relating to specifications is shown in Table 14, data relating to variable surface distances is shown in Table 15, and data relating to aspheric coefficients is shown in Table 16. In basic lens data of Table 13, text reading (EXT) is described in the column of the surface number of the surface corresponding to the M2E lens group M2E along with the surface number. Respective aberration diagrams in the replacement state are shown in FIG. 8.

TABLE 13A

Example 3 (Replacement State) - Lens Data (n and ν are based on d line)

| Surface Number | Radius of Curvature | Surface Distance | n | ν | θgF | dn/dt |
|---|---|---|---|---|---|---|
| 1 | 955.81543 | 4.400 | 1.83400 | 37.21 | 0.58082 | 9.17 |
| 2 | 302.25870 | 3.644 | | | | |
| 3 | 297.42207 | 23.792 | 1.43387 | 95.18 | 0.53733 | −9.94 |
| 4 | −722.93744 | 22.015 | | | | |
| 5 | 296.36518 | 14.584 | 1.43387 | 95.18 | 0.53733 | −9.94 |
| 6 | ∞ | 0.120 | | | | |
| 7 | 476.16920 | 12.551 | 1.43387 | 95.18 | 0.53733 | −9.94 |
| 8 | ∞ | 2.750 | | | | |
| 9 | 171.21493 | 11.514 | 1.43875 | 94.94 | 0.53433 | −6.58 |
| 10 | 322.66349 | DD[10] | | | | |
| *11 | 1060.94223 | 2.000 | 2.00069 | 25.46 | 0.61364 | 3.80 |
| 12 | 64.68717 | 8.453 | | | | |
| 13 | −163.08241 | 1.500 | 1.78800 | 47.37 | 0.55598 | 4.46 |
| 14 | 118.42396 | 6.286 | | | | |
| 15 | −103.99855 | 1.512 | 1.73400 | 51.47 | 0.54874 | 5.96 |
| 16 | 129.96228 | 4.079 | 1.89286 | 20.36 | 0.63944 | 1.15 |
| 17 | 1710.87635 | 0.120 | | | | |
| 18 | 181.47743 | 10.158 | 1.80518 | 25.42 | 0.61616 | 1.24 |
| 19 | −56.50189 | 1.610 | 1.80400 | 46.53 | 0.55775 | 4.51 |
| 20 | −477.82923 | DD[20] | | | | |
| 21 | 212.18454 | 6.985 | 1.43700 | 95.10 | 0.53364 | −6.14 |
| *22 | −213.88627 | DD[22] | | | | |
| 23 | 122.76002 | 8.725 | 1.43700 | 95.10 | 0.53364 | −6.14 |
| 24 | −213.35733 | 1.885 | 1.59270 | 35.31 | 0.59336 | 0.20 |
| 25 | 431.03082 | 14.389 | | | | |
| *26 | 181.89382 | 6.303 | 1.43700 | 95.10 | 0.53364 | −6.14 |
| 27 | −418.50132 | 0.179 | | | | |
| 28 | 620.24327 | 1.875 | 1.84666 | 23.78 | 0.62054 | 1.38 |
| 29 | 276.42951 | 8.433 | 1.43700 | 95.10 | 0.53364 | −6.14 |
| 30 | −118.94996 | DD[30] | | | | |

TABLE 13B

Example 3 (Replacement State) - Lens Data (n and ν are based on d line)

| Surface Number | Radius of Curvature | Surface Distance | n | ν | θgF | dn/dt |
|---|---|---|---|---|---|---|
| 31 (Stop) | ∞ | 4.338 | | | | |
| 32 | −472.78842 | 0.875 | 1.59522 | 67.73 | 0.54426 | −5.84 |
| 33 | 37.79609 | 0.120 | | | | |
| 34 | 37.07247 | 3.277 | 1.84139 | 24.56 | 0.61274 | 11.06 |
| 35 | 69.41856 | 4.015 | | | | |
| 36 | −82.56395 | 0.875 | 1.56732 | 42.82 | 0.57309 | 2.87 |
| 37 | 905.88105 | 7.150 | | | | |
| 38 (EXT) | 80.28483 | 4.635 | 1.80400 | 46.53 | 0.55775 | 4.51 |
| 39 (EXT) | −116.05269 | 1.954 | 1.80518 | 25.42 | 0.61616 | 1.24 |
| 40 (EXT) | 9658.72372 | 3.742 | | | | |
| 41 (EXT) | −176.47308 | 3.029 | 1.78472 | 25.68 | 0.61621 | 1.53 |
| 42 (EXT) | 51.37453 | 6.510 | 1.56883 | 56.04 | 0.54853 | 6.56 |
| 43 (EXT) | −58.00579 | 1.643 | | | | |
| 44 (EXT) | 306.27765 | 5.320 | 1.84666 | 23.78 | 0.62054 | 1.38 |
| 45 (EXT) | −37.46210 | 1.010 | 1.69680 | 55.53 | 0.54341 | 4.06 |
| 46 (EXT) | 92.43885 | 5.306 | | | | |
| 47 (EXT) | −36.66957 | 1.000 | 1.81600 | 46.62 | 0.55682 | 5.21 |
| 48 (EXT) | −70.51093 | 16.458 | | | | |
| 49 | 562.41538 | 19.985 | 1.56883 | 56.36 | 0.54890 | 1.84 |
| 50 | −92.64291 | 1.190 | | | | |
| 51 | 88.31713 | 11.717 | 1.56883 | 56.36 | 0.54890 | 1.84 |
| 52 | −56.75558 | 0.875 | 1.91082 | 35.25 | 0.58224 | 5.28 |
| 53 | 101.81604 | 0.976 | | | | |
| 54 | 91.40555 | 5.878 | 1.43875 | 94.66 | 0.53402 | −6.11 |
| 55 | −54.68374 | 0.969 | | | | |
| 56 | 152.37116 | 5.561 | 1.67270 | 32.10 | 0.59891 | 3.00 |
| 57 | −44.68980 | 0.875 | 1.90366 | 31.31 | 0.59481 | 4.05 |
| 58 | 1213.00724 | 0.250 | | | | |

TABLE 13B-continued

Example 3 (Replacement State) - Lens Data (n and ν are based on d line)

| Surface Number | Radius of Curvature | Surface Distance | n | ν | θgF | dn/dt |
|---|---|---|---|---|---|---|
| 59 | ∞ | 1.000 | 1.51633 | 64.14 | 0.53531 | 2.71 |
| 60 | ∞ | 0.000 | | | | |
| 61 | ∞ | 63.000 | 1.60863 | 46.60 | 0.56787 | 3.04 |
| 62 | ∞ | 8.500 | 1.51633 | 64.14 | 0.53531 | 2.71 |
| 63 | ∞ | 31.202 | | | | |

TABLE 14

Example 3 (Replacement State) - Specifications (d line)

| | Wide Angle End | Telephoto End |
|---|---|---|
| Zoom Magnification | 1.0 | 44.1 |
| f | 21.325 | 940.421 |
| FNo. | 3.63 | 5.60 |
| 2ω [°] | 49.0 | 1.2 |

TABLE 15

Example 3 (Replacement State) - Variable Surface Distances

| | Wide Angle End | Telephoto End |
|---|---|---|
| DD[10] | 3.654 | 180.163 |
| DD[20] | 291.030 | 2.597 |
| DD[22] | 2.632 | 4.896 |
| DD[30] | 3.068 | 112.728 |

TABLE 16

Example 3 (Replacement State) - Aspheric Coefficients

| | Surface Number | | |
|---|---|---|---|
| | 11 | 22 | 26 |
| KA | 6.1978006E+00 | 9.9811835E−01 | 8.2319259E−01 |
| A4 | −1.4915264E−07 | 5.2908271E−08 | −4.0509610E−07 |
| A6 | 6.4838119E−11 | −1.2361048E−11 | −2.9429045E−11 |
| A8 | −1.4755986E−13 | 4.2840858E−14 | 7.2124987E−14 |
| A10 | −1.2425766E−15 | 2.6115764E−16 | 5.3114050E−17 |
| A12 | 9.0090698E−18 | −1.0578007E−18 | −3.8104872E−19 |
| A14 | −2.4637037E−20 | 1.7610551E−21 | 5.5044486E−22 |
| A16 | 3.3954656E−23 | −1.5478807E−24 | −3.3967503E−25 |
| A18 | −2.3518743E−26 | 7.0299898E−28 | 7.5129586E−29 |
| A20 | 6.5195965E−30 | −1.2960971E−31 | 2.3843345E−33 |

Table 17 shows values corresponding to the conditional expressions (1) to (9) of the zoom lenses of Examples 1 to 3. The values shown in Table 17 are values for d line.

TABLE 17

| Number of Expression | Conditional Expression | Example 1 | Example 2 | Example 3 |
|---|---|---|---|---|
| (1) | vd1 | 56.0 | 56.2 | 56.0 |
| (2) | dn/dt1 | 6.56 | 6.60 | 6.56 |
| (3) | dn/dt_ave_P | 4.34 | 4.37 | 4.15 |
| (4) | dn/dt_ave_N | 3.24 | 3.29 | 3.01 |
| (5) | θgF + 0.001625 × vd1 | 0.639 | 0.633 | 0.639 |
| (6) | (θgF + 0.001625 ×P vd1)_ave_ | 0.644 | 0.642 | 0.644 |
| (7) | nd_ave_N − nd_ave_P | 0.016 | 0.019 | 0.026 |

TABLE 17-continued

| Number of Expression | Conditional Expression | Example 1 | Example 2 | Example 3 |
|---|---|---|---|---|
| (8) | vd_P1 − vd_N1 | 20.0 | 20.0 | 21.1 |
| (9) | vd_N2 − vd_P2 | 28.5 | 26.4 | 31.8 |

As can be understood from data described above, all of the zoom lenses of Examples 1 to 3 reduce chromatic aberration while favorably correcting focal position misalignment with change in temperature at the time of replacement with an extender lens, thereby implementing high optical performance.

Figure 9:
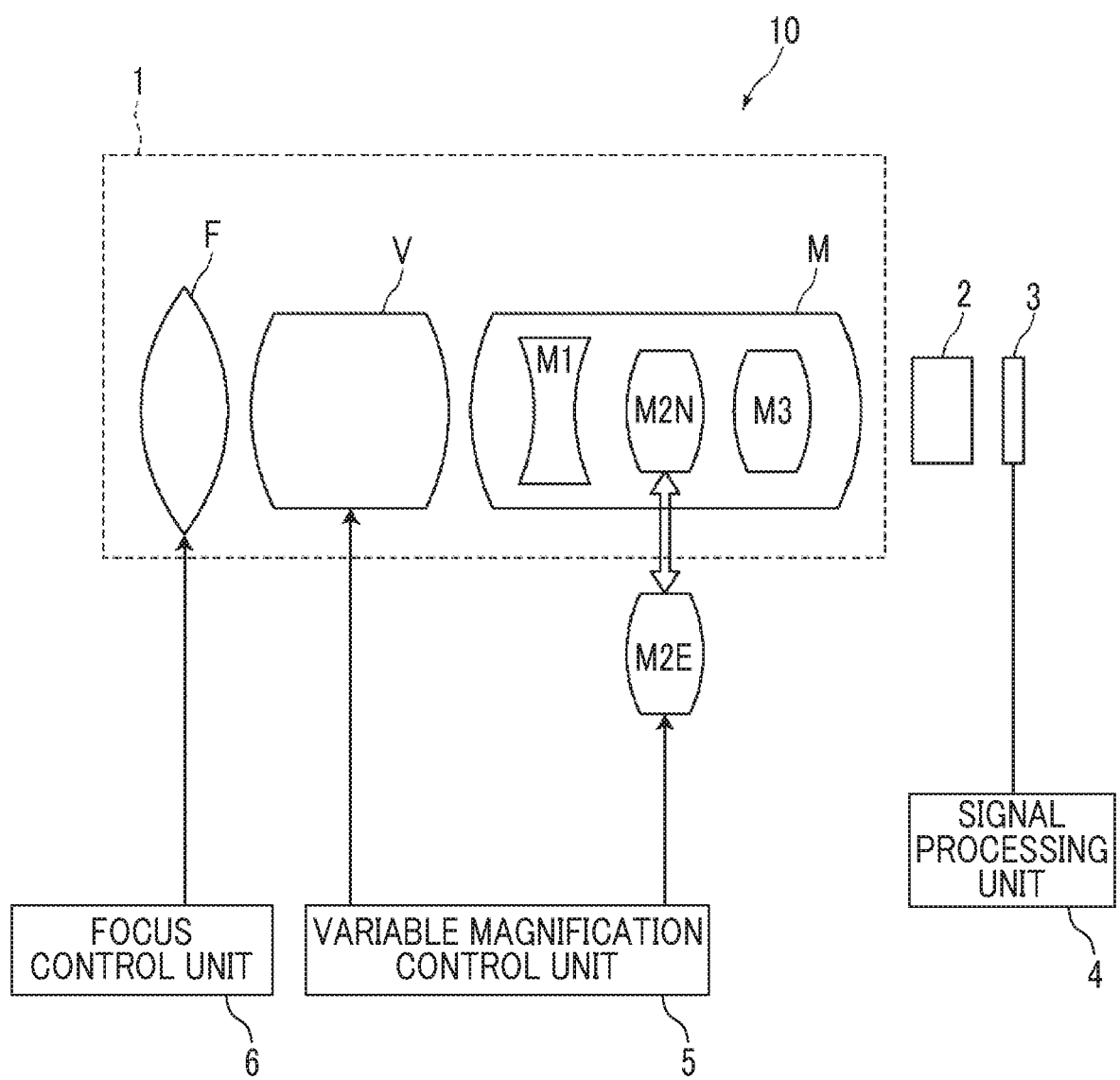
FIG. 9 is a schematic configuration diagram of an imaging apparatus according to an embodiment of the invention.

Next, an imaging apparatus according to an embodiment of the invention will be described. FIG. 9 is a schematic configuration diagram of an imaging apparatus 10 using a zoom lens 1 according to the embodiment of the invention as an example of the imaging apparatus according to the embodiment of the invention. As the imaging apparatus 10, for example, a broadcasting camera, a movie imaging camera, a digital camera, a video camera, a surveillance camera, and the like can be exemplified.

The imaging apparatus 10 comprises a zoom lens 1, an optical member 2 disposed on the image side of the zoom lens 1, and an imaging element 3 disposed on the image side of the optical member 2. The optical member 2 is assumed to be a filter and/or a prism. In FIG. 9, the focusing unit F, the variable magnification unit V, the image forming unit M, the M1 lens group M1, the M2N lens group M2N, the M3 lens group M3, and the M2E lens group M2E as an extender lens in the zoom lens 1 are schematically shown, and the aperture stop St is not shown.

The imaging element 3 converts an optical image formed by the zoom lens 1 to an electrical signal, and for example, a charge coupled device (CCD) or a complementary metal oxide semiconductor (CMOS), or the like can be used. The imaging element 3 is disposed such that the imaging surface coincides with the image plane of the zoom lens 1. In FIG. 9, although only one imaging element 3 is shown, the imaging apparatus of the invention is not limited thereto, and may be a so-called three-plate imaging apparatus having three imaging elements.

The imaging apparatus 10 comprises a signal processing unit 4 that executes calculation processing on an output signal from the imaging element 3, a variable magnification control unit 5 that controls variable magnification of the zoom lens 1, and a focus control unit 6 that controls focusing of the zoom lens 1. Replacement of the M2N lens group M2N and the M2E lens group M2E as an extender lens is performed by the variable magnification control unit 5.

Although the invention has been described through the embodiment and the examples above, the invention is not limited to the above-described embodiment and examples, and various modifications may be made. For example, the number of lenses in each lens group, and the radius of curvature, the surface distance, the refractive index, the Abbe number, the partial dispersion ratio, and the aspheric coefficient of each lens are not limited to the values shown in the numerical examples, and may take other values.

EXPLANATION OF REFERENCES

1: zoom lens
2: optical member
3: imaging element
4: signal control unit
5: variable magnification control unit
6: focus control unit
10: imaging apparatus
F: focusing unit
F2: focusing lens group
L11 to L13, L21 to L27, L31 to L36: lens
M: image forming unit
M1: M1 lens group
M2N: M2N lens group
M2E: M2E lens group
M3: M3 lens group
PP: optical member
Sim: image plane
St: aperture stop
V: variable magnification unit
V1: V1 lens group
V2: V2 lens group
V3: V3 lens group
Z: optical axis

What is claimed is:

1. A zoom lens having, in order from an object side, a focusing unit including a focusing lens group moving for focusing, a variable magnification unit including at least two variable magnification lens groups moving while changing a mutual interval for variable magnification, an aperture stop, and an image forming unit including an image forming lens group, wherein the image forming unit consists of an M1 lens group, an M2N lens group, and an M3 lens group in order from the object side, the M2N lens group is replaceable with an M2E lens group that enlarges an image forming magnification, in a case where an Abbe number of a positive lens of the M2E lens group is vd1, an average value of temperature change coefficients from 0° C. to 40° C. of a refractive index with respect to d line in the air is dn/dt, and dn/dt of the positive lens of the M2E lens group is dn/dt1, the M2E lens group comprises at least one positive lens satisfying conditional expressions (1) and (2), and $$55 < vd1 \tag{1}$$

$$5.5 < dn/dt1 < 10 \tag{2}$$

in a case where an average value of dn/dt of the positive lenses of the M2E lens group is dn/dt_ave_P, and an average value of dn/dt of negative lenses of the M2E lens group is dn/dt_ave_N, conditional expressions (3) and (4) are satisfied.

$$3.5 < dn/dt\_ave\_P < 6 \tag{3}$$

$$1.5 < dn/dt\_ave\_N < 6 \tag{4}$$

2. The zoom lens according to claim 1, wherein, in a case where a partial dispersion ratio of the positive lens of the M2E lens group between g line and F line is θgF, the at least one positive lens satisfying the conditional expressions (1) and (2) satisfies a conditional expression (5).

$$0.62 < \theta gF + 0.001625 \times vd1 < 0.67 \tag{5}$$

3. The zoom lens according to claim 1, wherein, in a case where a partial dispersion ratio of the positive lens of the M2E lens group between g line and F line is θgF, and an average value of (θgF+0.001625× vd1) of the positive lenses of the M2E lens group is (θgF+0.001625×vd1)_ave_P, a conditional expression (6) is satisfied.

$$0.62 < (\theta gF + 0.001625 \times vd1)\_ave\_P < 0.67 \tag{6}$$

4. The zoom lens according to claim 1,
wherein, in a case where an average value of refractive indexes of the negative lenses of the M2E lens group is nd_ave_N, and an average value of refractive indexes of the positive lenses of the M2E lens group is nd_ave_P, a conditional expression (7) is satisfied.

$$0.01 < nd\_ave\_N - nd\_ave\_P < 0.2 \quad (7)$$

5. The zoom lens according to claim 1,
wherein the M2E lens group comprises at least three cemented lenses each comprising at least one positive lens and at least one negative lens.

6. The zoom lens according to claim 5,
wherein, in a case where an Abbe number for d line of the positive lens composing the cemented lens of the M2E lens group is vd_P1, an Abbe number for d line of the positive lens composing the cemented lens of the M2E lens group is vd_P2, an Abbe number for d line of the negative lens composing the cemented lens of the M2E lens group is vd_N1, and an Abbe number for d line of the negative lens composing the cemented lens of the M2E lens group is vd_N2,
at least two of the cemented lenses in the M2E lens group satisfy a conditional expression (8), and $$10 < vd\_P1 - vd\_N1 < 30 \quad (8)$$

at least one of the cemented lenses in the M2E lens group satisfies a conditional expression (9).

$$10 < vd\_N2 - vd\_P2 < 35 \quad (9)$$

7. The zoom lens according to claim 5,
wherein the M2E lens group consists of, in order from the object side, the three cemented lenses, and a negative meniscus lens concave toward the object side.

8. The zoom lens according to claim 1,
wherein the focusing lens group has a positive refractive power,
the variable magnification unit consists of, in order from the object side, a V1 lens group having a negative refractive power, a V2 lens group having a positive refractive power, and a V3 lens group having a positive refractive power,
the image forming unit has a positive refractive power, and
at the time of variable magnification from a wide angle end to a telephoto end, the V1 lens group and a combined group consisting of the V2 lens group and the V3 lens group simultaneously pass through points where a lateral magnification is −1.

9. The zoom lens according to claim 1,
wherein the M1 lens group has a negative refractive power, and the M2E lens group and the M3 lens group have a positive refractive power.

10. The zoom lens according to claim 1,
wherein the positive lens satisfying the conditional expressions (1) and (2) satisfies at least one of a conditional expression (1-1) or (2-1).

$$55 < vd1 < 70 \quad (1\text{-}1)$$

$$5.75 < dn/dt1 < 8.5 \quad (2\text{-}1)$$

11. The zoom lens according to claim 1,
wherein the positive lens satisfying the conditional expressions (1) and (2) satisfies at least one of a conditional expression (1-2) or (2-2).

$$55 < vd1 < 60 \quad (1\text{-}2)$$

$$6 < dn/dt1 < 7.5 \quad (2\text{-}2)$$

12. The zoom lens according to claim 1,
wherein at least one of a conditional expressions (3-1) or (4-1) is satisfied.

$$3.75 < dn/dt\_ave\_P < 5.5 \quad (3\text{-}1)$$

$$2 < dn/dt\_ave\_N < 5 \quad (4\text{-}1)$$

13. The zoom lens according to claim 1,
wherein a conditional expression (3-2) is satisfied.

$$4 < dn/dt\_ave\_P < 5 \quad (3\text{-}2)$$

14. The zoom lens according to claim 2,
wherein the at least one positive lens satisfying the conditional expressions (1) and (2) satisfies a conditional expression (5-1).

$$0.63 < \theta gF + 0.001625 \times vd1 < 0.66 \quad (5\text{-}1)$$

15. The zoom lens according to claim 3,
wherein a conditional expression (6-1) is satisfied.

$$0.63 < (\theta gF + 0.001625 \times vd1)\_ave\_P < 0.66 \quad (6\text{-}1)$$

16. The zoom lens according to claim 4,
wherein a conditional expression (7-1) is satisfied.

$$0.01 < nd\_ave\_N - nd\_ave\_P < 0.15 \quad (7\text{-}1)$$

17. The zoom lens according to claim 6,
wherein the at least two of the cemented lenses in the M2E lens group satisfy a conditional expression (8-1).

$$17 < vd\_P1 - vd\_N1 < 30 \quad (8\text{-}1)$$

18. The zoom lens according to claim 6,
wherein the at least one of the cemented lenses in the M2E lens group satisfies a conditional expression (9-1).

$$17 < vd\_N2 - vd\_P2 < 35 \quad (9\text{-}1)$$

19. An extender lens consisting of the M2E lens group in the zoom lens according to claim 1.

20. An imaging apparatus comprising:
the zoom lens according to claim 1.

* * * * *